(12) United States Patent
Kusuda et al.

(10) Patent No.: US 10,705,345 B2
(45) Date of Patent: Jul. 7, 2020

(54) HEAD-MOUNTED DISPLAY, IMAGE DISPLAY UNIT, AND MOUNTING MEMBER

(71) Applicant: Brother Kogyo Kabushiki Kaisha, Nagoya-shi, Aichi-ken (JP)

(72) Inventors: Miyuki Kusuda, Nagoya (JP); Hirotoshi Ishizaki, Nagakute (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 638 days.

(21) Appl. No.: 15/444,464

(22) Filed: Feb. 28, 2017

(65) Prior Publication Data

US 2017/0168305 A1 Jun. 15, 2017

Related U.S. Application Data

(63) Continuation of application No. PCT/JP2015/075833, filed on Sep. 11, 2015.

(30) Foreign Application Priority Data

Sep. 12, 2014 (JP) .................................. 2014-187101
Jan. 6, 2015 (JP) .................................. 2015-001111

(51) Int. Cl.
*G02B 27/14* (2006.01)
*G02B 27/01* (2006.01)
*H04N 5/64* (2006.01)

(52) U.S. Cl.
CPC ..... *G02B 27/0176* (2013.01); *G02B 27/0172* (2013.01); *G02B 2027/0156* (2013.01);
(Continued)

(58) Field of Classification Search
CPC ........ G02B 2027/0156; G02B 27/0172; G02B 27/0101; G02B 2027/0178;
(Continued)

(56) References Cited

U.S. PATENT DOCUMENTS 8,994,612 B2 3/2015 Fujishiro
2010/0073262 A1 3/2010 Matsumoto
(Continued)

FOREIGN PATENT DOCUMENTS

JP H08-131399 A 5/1996
JP H11-327460 A 11/1999
(Continued)

OTHER PUBLICATIONS

Mar. 14, 2017—IPRP—App PCT/JP2015/075833.
(Continued)

*Primary Examiner* — Alicia M Harrington
(74) *Attorney, Agent, or Firm* — Banner & Witcoff, Ltd.

(57) ABSTRACT

Trapezoidal protrusions, which protrude to the inside of a region, are provided on a right-side part and a left-side part of a mounting member. Holding sections, which extend in a circumferential direction, are formed in lateral surfaces of the trapezoidal protrusions. The holding sections include first holders which are opened to an upper side, and a second holder that is opened to a lower side. The first holders, and the second holder are respectively provided with second protrusions which protrude into a groove in a plural number, and can maintain the cable in a groove. First protrusions are respectively provided on rear-side ends to guide lead-out of the cable from the mounting member.

1 Claim, 15 Drawing Sheets

(52) U.S. Cl.
CPC ........... *G02B 2027/0159* (2013.01); *G02B 2027/0169* (2013.01); *H04N 5/64* (2013.01)

(58) Field of Classification Search
CPC .......... G02B 27/0132; G02B 2027/011; G02B 27/02; G02B 27/0176; H04N 5/64
See application file for complete search history.

(56) References Cited

U.S. PATENT DOCUMENTS

| | | | |
|---|---|---|---|
| 2011/0090135 A1 | 4/2011 | Tricoukes et al. | |
| 2012/0200477 A1 | 8/2012 | Fujishiro | |
| 2015/0378160 A1* | 12/2015 | Lee | G02B 27/0172 345/8 |

FOREIGN PATENT DOCUMENTS

| JP | 2000-152126 A | 5/2000 |
|---|---|---|
| JP | 2001-069427 A | 3/2001 |
| JP | 2001-330794 A | 11/2001 |
| JP | 2004-080679 A | 3/2004 |
| JP | 2005-311961 A | 11/2005 |
| JP | 2008-148028 A | 6/2008 |
| JP | 2008-258784 A | 10/2008 |
| JP | 2010-141861 A | 6/2010 |
| JP | 2012-163640 A | 8/2012 |

OTHER PUBLICATIONS

Jun. 5, 2018—(EP) Partial Supplementary Search Report—App 15839253.0.

Dec. 15, 2015—International Search Report—Intl App PCT/JP2015/075833.

* cited by examiner

HEAD-MOUNTED DISPLAY, IMAGE DISPLAY UNIT, AND MOUNTING MEMBER

CROSS-REFERENCE TO RELATED APPLICATIONS

This application is a continuation application of PCT International Application No. PCT/JP2015/075833 which has an International filing date of Sep. 11, 2015 and designated the United States of America, and claiming priority on Patent Application No. 2014-187101 filed in Japan on Sep. 12, 2014 and on Patent Application No. 2015-001111 filed in Japan on Jan. 6, 2015.

TECHNICAL FIELD

The present disclosure relates to a head-mounted display, an image display unit that is used in the head-mounted display, and a mounting member that is used in the head-mounted display.

BACKGROUND

There is known a head-mounted display (hereinafter, referred to as "HMD") in which a mounting member, on which the image display section is mounted, is mounted on the head of a user, and which presents an image to an eye of the user. A cable, which electrically connects the image display section to an external device, is led out from the image display section and is wired through a mounting member. An image display section of a known HMD is mounted in a head-band-shaped mounting member. During mounting of the mounting member on the head, the image display section is disposed in front of an eye of a user. A cable, which is led out from the image display section, is clip-fixed to the mounting member. The cable is wired through the mounting member on an occipital region side of the user. An image display section of a known HMD is mounted in a lens portion of an eyeglass-frame-shaped mounting member. During mounting of the mounting member on the head, the image display section is disposed in front of an eye of a user. A cable, which is led out from the image display section, is wired inside the mounting member. The cable is led out from a rear end of a temple portion to the outside of the mounting member.

SUMMARY

However, in a case of removing the image display section from the mounting member, in one known HMD, it is necessary to remove a casing cover of the mounting member and to lead out the cable from the inside of the casing, and thus the removal work is complicated. In the other known HMD, only the clip-fixed cable is removed from the mounting member, and thus the work of removing the image display section from the mounting member is easy. However, the cable is clip-fixed to the mounting member at only one point, and thus a gap is likely to occur between the cable and the mounting member. Therefore, during putting-on, taking-off, or using of the HMD, the cable is likely to be hooked or rolled in a head portion such as the hair and the ear of the user, or a temple and the like when the user wears eyeglasses, and thus the cable is likely to be detached.

According to one aspect of the present disclosure, there are provided a head-mounted display in which a cable that is led out from an image display section is detachably held and the cable is less likely to be detached, an image display unit that is used in the head-mounted display, and a mounting member that is used in the head-mounted display.

One aspect of the present disclosure is a head-mounted display, comprising: a mounting member including, a first part that extends in a first direction, a second part that extends in the first direction, and is disposed to face the first part on one side in a second direction perpendicular to the first direction, and a third part which extends in the second direction, and in which a portion on the other side in the second direction continues to a portion of the first part on one side in the first direction, and a portion on the one side in the second direction continues to a portion of the second part on the one side in the first direction; an image display section that displays an image; an arm that connects at least one of the first part and the second part to the image display section; a cable that is led out from the image display section; and a first groove that is provided in the at least one of the first part and the second part from a predetermined first position in the first direction to a second position on the other side in the first direction with respect to the first position, detachably holds the cable, and extends continuously or intermittently along a shape of the at least one of the first part and the second part.

The other aspect of the present disclosure is an image display unit, comprising: a rod-shaped arm; an image display section that displays an image; a first ball joint that connects the arm to a connection object; a second ball joint that connects the arm to the image display section; a cable that is led out from the image display section; and a groove that is provided in a surface of the arm, extends in a longitudinal direction of the arm, and detachably holds the cable, wherein the first ball joint includes, a first ball stud including a first rod part of which one end is connected to the arm, and a first sphere part that is provided in the other end of the first rod part, and a first socket that includes a circular first hole part through which the first rod part passes, and slidably supports the first sphere part in a case where the arm is connected to the connection object, the second ball joint includes, a second ball stud which includes a second rod part of which one end is connected to the arm, and a second sphere part that is provided in the other end of the second rod part, and which is spaced away from the first ball stud in the longitudinal direction, and a second socket that is connected to the image display section to slidably support the second sphere part, and includes a circular second hole part through which the second rod part passes, and the groove is located on one side with respect to the first rod part and the second rod part in a width direction of the arm.

The still other aspect of the present disclosure is a mounting member of a head-mounted display, comprising: a first part that extends in a first direction; a second part that extends in the first direction, and is disposed to face the first part on one side in a second direction that is perpendicular to the first direction; a third part which extends in the second direction, and in which a portion on the other side in the second direction continues to a portion of the first part on one side in the first direction, and a portion on the one side in the second direction continues to a portion of the second part on the one side in the first direction; and a groove that is provided in at least one of the first part and the second part from a predetermined first position in the first direction to a second position on the other side in the first direction with respect to the first position, detachably holds a cable extending from an image display section of the head-mounted display, and extends continuously or intermittently along a shape of the at least one of the first part and the second part.

The above and further objects and features will more fully be apparent from the following detailed description with accompanying drawings.

DETAILED DESCRIPTION

Figure 1:
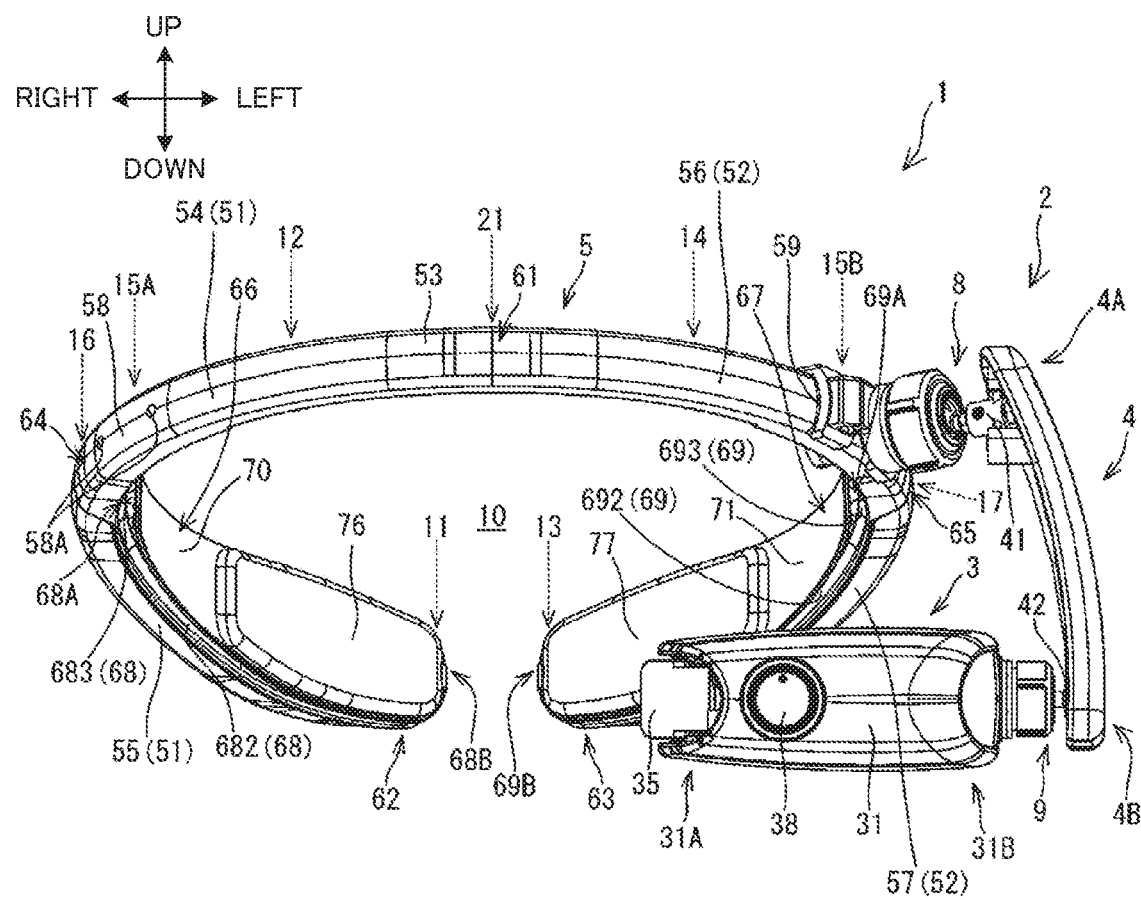
FIG. 1 is a perspective view when an HMD 1 according to First Embodiment is seen from a front lower side.

Hereinafter, one embodiment of the present disclosure will be described with reference to FIGS. 1 to 8. The drawings to be referred are used to describe technical characteristics which can be employed in the present disclosure. A configuration of device described in the drawings is not intended to be limited thereto, and is illustrative only.

First Embodiment

Figure 2:
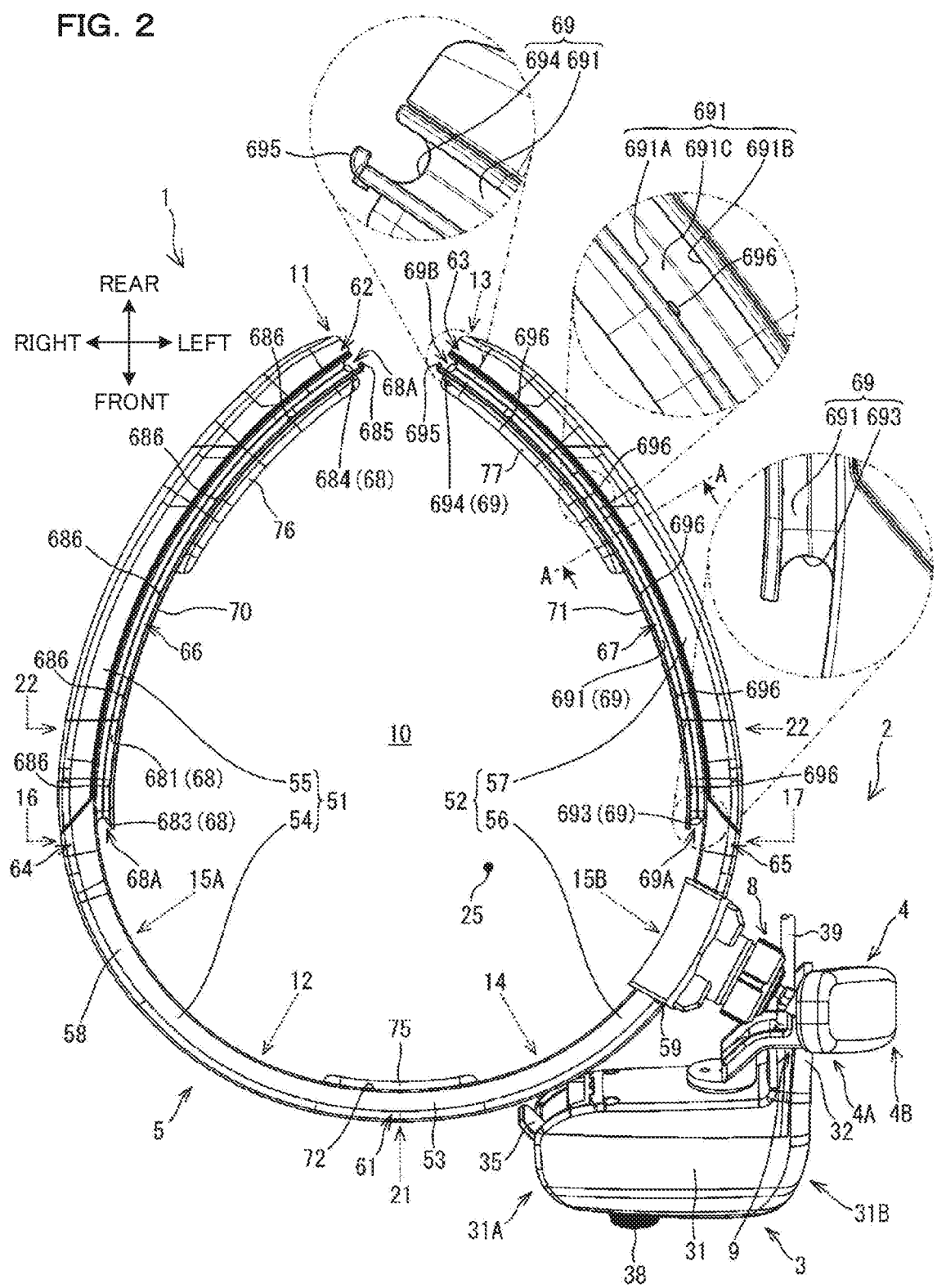
FIG. 2 is a plan view of the HMD 1.
Figure 3:
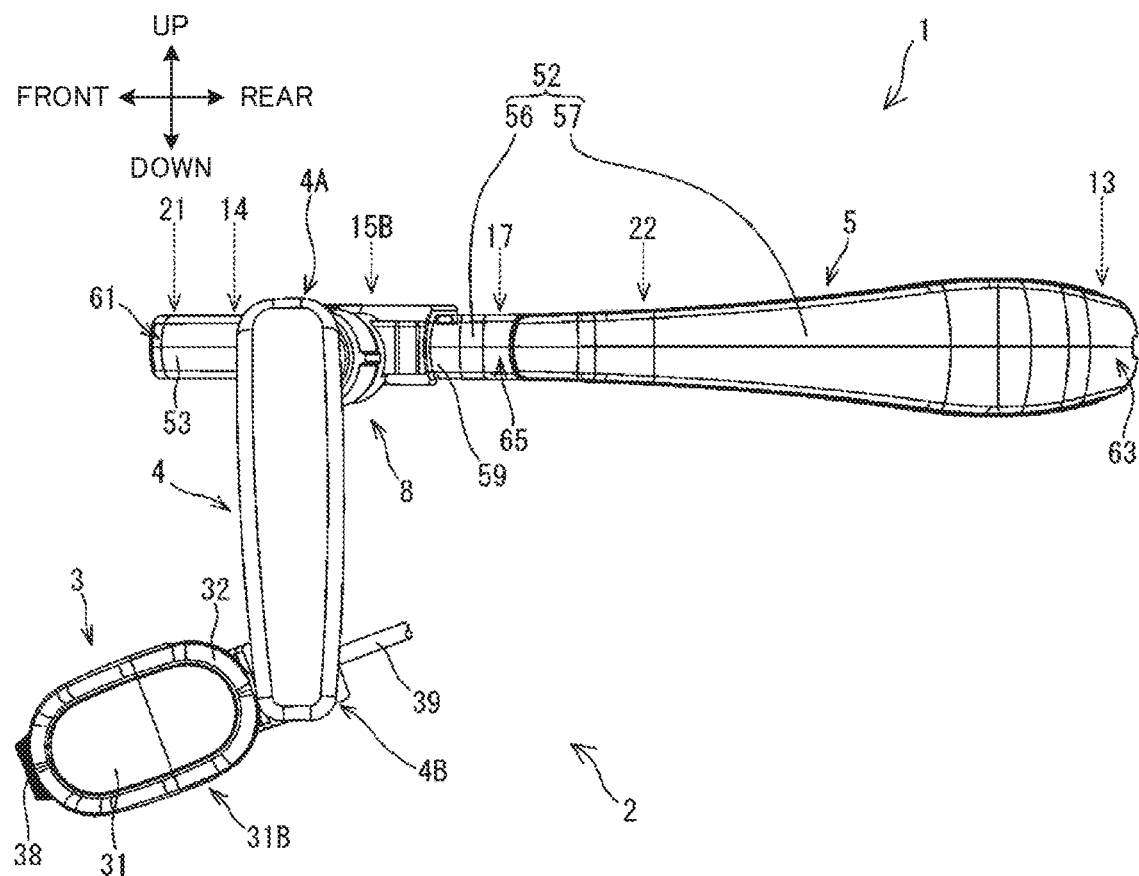
FIG. 3 is a left side view of the HMD 1.

As illustrated in FIG. 1 to FIG. 3, a head-mounted display (hereinafter, refer to as "HMD") 1 is an optical transmission type HMD that can be mounted on the head of a user. Light of a landscape in front of eyes of the user is transmitted through a half mirror 35 and is directly guided to the eye of the user. A projection type of the HMD 1 is a virtual image projection type. The half mirror 35 reflects light of an image, which is displayed on a liquid crystal panel (not illustrated), toward one eye of the user. The HMD 1 can allow the user to recognize the image overlapping a landscape in front of the eyes. The HMD 1 comprises an image display section 3, an arm 4, a mounting member 5, and connection mechanisms 8 and 9. The image display section 3, the arm 4, and the connection mechanisms 8 and 9 constitute an image display unit 2 that can be attached to and detached from the mounting member 5. Hereinafter, an upper side, a lower side, a left side, a right side, a front side, and a rear side of the HMD 1 will be defined for easy understanding of the drawings. For example, the upper side, the lower side, the left side, and the right side of the HMD 1 respectively correspond to an upper side, a lower side, a right side, and a left side in FIG. 1. For example, the front side and the rear side of the HMD 1 respectively correspond to a lower side and an upper side of FIG. 2. The upper side, the lower side, the left side, the right side, the front side, and the rear side of the HMD 1 respectively correspond to user-based directions when the mounting member 5 is mounted on the user.

The mounting member 5 is made of a flexible material such as a resin and a metal (for example, stainless steel). The mounting member 5 is an elongated plate-shaped member which is formed in an approximately circular shape and in which the rear side is opened. A shape of the mounting member 5 of First Embodiment is a shape that is symmetric in a right and left direction and symmetric in an up and down direction. Hereinafter, description will be given by dividing the configuration of the mounting member 5 into five portions for convenience. The mounting member 5 includes an intermediate-front part 53, a right-front part 54, a right-rear part 55, a left-front part 56, and a left-rear part 57.

The right-front part 54 extends between a position 12 and a position 16. The position 12 is located on the front side and the left side with respect to the position 16. The right-front part 54 is curved in a convex shape toward an outer side (for example, the front side and the right side) of a region 10 that is surrounded by the mounting member 5. The right-rear part 55 extends between the position 16 and a position 11. The position 11 is located on the rear side and the left side with respect to the position 16. The right-rear part 55 continues to the right-front part 54. The right-rear part 55 is curved in a convex shape toward an outer side (for example, the rear side and the right side) of the region 10. In a case where the configuration of the mounting member 5 is divided into three portions including the intermediate-front part 53, a right-side part 51, and a left-side part 52, the right-front part 54 and the right-rear part 55 constitute the right-side part 51. The right-side part 51 is connected to the right side of the intermediate-front part 53, and extends toward a rear side. The right-side part 51 is curved in a convex shape toward the right side.

The left-front part 56 extends between a position 14 and a position 17. The position 17 is located on a left side of the position 16. At a left-side position of the position 12, the position 14 is located on the front side and the right side with respect to the position 17. The left-front part 56 is curved in a convex shape toward an outer side (for example, the front side and the left side) of the region 10. The left-rear part 57 extends between the position 17 and a position 13. At a left-side position of the position 11, the position 13 is located on the rear side and the right side with respect to the position 17. The left-rear part 57 continues to the left-front part 56. The left-rear part 57 is curved in a convex shape toward an outer side (for example, the rear side and the left side) of the region 10. In other words, the left-front part 56 and the left-rear part 57 constitute the left-side part 52 of the mounting member 5. The left-side part 52 is connected to the left side of the intermediate-front part 53 and extends toward the rear side. The left-side part 52 is curved in a convex shape toward the left side.

The intermediate-front part 53 extends in the right and left direction between the position 14 and the position 12. The intermediate-front part 53 continues to the right-front part 54 and the left-front part 56. The intermediate-front part 53 is curved in a convex shape toward an outer side (for example, the front side) of the region 10. An end 61 is disposed at the central position 21 of the mounting member 5 in the right and left direction. The end 61 is located on the most front side of the mounting member 5. Ends 62 and 63 are respectively disposed at the positions 11 and 13. The ends 62 and 63 are located on the most rear side of the mounting member 5. An end 64 is disposed at the position 16. The end 64 is located on the most right side of the mounting member 5. An end 65 is disposed at the position 17. The end 65 is located on the most left side of the mounting member 5.

The head of a user is interposed in the mounting member 5 during mounting of the mounting member 5. The right-rear part 55 and the left-rear part 57 respectively press temporal regions of the user. A curved shape of the mounting member 5 is different for each portion so as to obtain a sufficient pressure for supporting the weight of the HMD 1. The position 12 is located at a boundary between a curved shape of the intermediate-front part 53 and a curved shape of the right-front part 54. The position 14 is located at a boundary between the curved shape of the intermediate-front part 53 and a curved shape of the left-front part 56. In addition, the position 16 is located at a boundary between the curved shape of the right-front part 54 and a curved shape of the right-rear part 55. The position 17 is located at a boundary between the curved shape of the left-front part 56 and a curved shape of the left-rear part 57.

In a plan view, a radial direction of a circle of curvature coming into contact with a surface, which faces the inside of the region 10, of the mounting member 5, is defined as a thickness direction of the mounting member 5. The size in the thickness direction at the intermediate-front part 53, the right-front part 54, and the left-front part 56 of the mounting member 5, is approximately the same. The size in the thickness direction at the right-rear part 55 and the left-rear part 57 is larger than the size in the thickness direction at the intermediate-front part 53, the right-front part 54, and the left-front part 56 by a size of trapezoidal protrusion 66 or 67 (to be described later) in the thickness direction. The size in the up and down direction at the intermediate-front part 53, the right-front part 54, and the left-front part 56 is approximately the same. The size in the up and down direction at the right-rear part 55 and the left-rear part 57 gradually increases as it goes from the front side toward the rear side. Specifically, the size in the up and down direction is the largest at a near position, which is spaced away from the ends 62 and 63 toward the front side in a predetermined distance, of the ends 62 and 63, and gradually decreases from the near position toward the ends 62 and 63.

The trapezoidal protrusions 66 and 67, which protrude into the region 10, are respectively provided at the right-side part 51 and the left-side part 52 of the mounting member 5. Holding sections 68 and 68 (to be described later), which extend in a groove shape along a circumferential direction with respect to a protruding direction, are respectively provided on lateral surfaces of the trapezoidal protrusions 66 and 67 with respect to the protruding direction (for example, the thickness direction). Furthermore, the lateral surfaces of the trapezoidal protrusions 66 and 67 with respect to the thickness direction (hereinafter, also referred to simply as "lateral surfaces of the trapezoidal protrusions 66 and 67) are surfaces which extend along a circumferential direction with the thickness direction set as an axis. The trapezoidal protrusions 66 and 67 extend between a predetermined first position in the front and rear direction of the mounting member 5 and a second position on the rear side with respect to the first position. That is, front-side ends 68A and 69A of the holding sections 68 and 69 are provided at the first position of the mounting member 5. Rear-side ends 68B and 69B of the holding sections 68 and 69 are provided at the second position of the mounting member 5. In First Embodiment, for example, the first position corresponds to the positions 16 and 17 of both of the ends 64 and 65 of the mounting member 5 in the right and left direction. The first position is located on the rear side with respect to connection positions (positions 15A and 15B of mounting sections 58 and 59 (to be described later)) to which the image display unit 2 is connected. In addition, the first position is located on the rear side with respect to a position 25 of the center of gravity (to be described later) of the HMD 1. The second position corresponds to the positions 11 and 13 of the rear-side ends 62 and 63 of the mounting member 5 in the front and rear direction. The trapezoidal protrusion 66 is provided from the position 16 to the position 11 at the right-side part 51. The trapezoidal protrusion 66 extends along the curved shape of the right-side part 51. The trapezoidal protrusion 67 is provided from the position 17 to the position 13 at the left-side part 52. The trapezoidal protrusion 67 extends along the curved shape of the left-side part 52. That is, the trapezoidal protrusions 66 and 67 are respectively provided at the right-rear part 55 and the left-rear part 57. The trapezoidal protrusions 66 and 67 are respectively provided with inner surfaces 70 and 71 which face the inside of the region 10. The inner surfaces 70 and 71 further protrude in the thickness direction toward the inside of the region 10 with respect to inner surfaces at the right-front part 54 and the left-front part 56. Accordingly, the inner surfaces 70 and 71 have a curved surface shape along the curved shapes of the right-rear part 55 and the left-rear part 57, respectively. Accordingly, the size of the trapezoidal protrusions 66 and 67 in the up and down direction also gradually increases as it goes from the front side to the rear side, is the largest in the vicinity of the ends 62 and 63, and gradually decreases as it goes toward the ends 62 and 63.

For example, the holding sections 68 and 69 are grooves which are provided (for example, formed) in the mounting member 5. Each of the grooves includes a groove bottom that extends along the curved shape of the mounting member 5, and a pair of side walls which extend from both ends of the groove bottom in a width direction and face each other. In First Embodiment, the holding sections 68 and 69 are respectively provided in the trapezoidal protrusions 66 and 67. The holding sections 68 and 69 are respectively provided on lateral surfaces of the trapezoidal protrusions 66 and 67. That is, the holding sections 68 and 69 are respectively opened to the lateral surfaces of the trapezoidal protrusions 66 and 67. A groove width direction of the holding sections 68 and 69 matches the thickness direction of the mounting member 5. Each of the holding sections 68 and 69 is provided to go around the periphery of each of the trapezoidal protrusions 66 and 67.

The holding section 68 includes a first holder 681, a second holder 682, a third holder 683, a fourth holder 684, a first protrusion 685, and a second protrusion 686. Similarly, the holding section 69 includes a first holder 691, a second holder 692, a third holder 693, a fourth holder 694, a first protrusion 695, and a second protrusion 696. The first holders 681 and 691 (refer to FIG. 2) are respectively opened on upper lateral surfaces of the trapezoidal protrusions 66 and 67. The first holders 681 and 691 respectively extend from the ends 64 and 65 to the ends 62 and 63. The first holders 681 and 691 are curved along the curved shapes of the right-side part 51 and the left-side part 52, respectively. The second holders 682 and 692 (refer to FIG. 1) are respectively opened on lower lateral surfaces of the trapezoidal protrusions 66 and 67. The second holders 682 and 692 also respectively extend from the ends 64 and 65 to the ends 62 and 63. The second holders 682 and 692 are curved along the curved shapes of the right-side part 51 and the left-side part 52, respectively. The third holders 683 and 693 are respectively opened on the front lateral surfaces of the trapezoidal protrusions 66 and 67. The third holder 683 connects the first holder 681 to the second holder 682 at the position 16 of the rear-side end 64. The third holder 693 connects the first holder 691 to the second holder 692 at the position 17 of the left-side end 65. The fourth holders 684 and 694 (refer to FIG. 2) are respectively opened on rear lateral surfaces of the trapezoidal protrusions 66 and 67. The fourth holder 684 connects the first holder 681 to the second holder 682 at the position 11 of the rear-side end 62. The fourth holder 694 connects the first holder 691 to the second holder 692 at the position 13 of the rear-side end 63.

The first protrusions 685 and 695 are respectively provided at the rear-side ends 62 and 63 of the mounting member 5. Each of the first protrusions 685 and 695 is provided on a side wall, which is close to the region 110, of a pair of side walls of each of the fourth holders 684 and 694. Alternatively, each of the first protrusions 685 and 695 may be provided at a portion (for example, the front side), which is close to the region 10, of portions on each of the lateral surfaces of the trapezoidal protrusions 66 and 67 which are adjacent to openings of the fourth holders 684 and 694. Furthermore, a region, which is surrounded by boundary lines between the lateral surface of the trapezoidal protrusion 66 or 67, and surfaces of the pair of side walls of the holding section 68 or 69, is referred to as "opening" of the groove (for example, the holding section 68 or 69). In other words, it is assumed that the opening represents a region, in which the holding section 68 or 69 is provided, in the lateral surface of the trapezoidal protrusion 66 or 67, that is, a region in the lateral surface that is considered to exist when the holding section 68 or 69 is not provided.

The first protrusions 685 and 695 respectively protrude toward the center of the fourth holders 684 and 694 in a groove width direction along the groove width direction. A protruding length of the first protrusion 685 or 695 is equal to or less than the half of a length of the fourth holder 684 or 694 in the groove width direction. A gap between an end, which is distant from the region 10, of the fourth holder 684 or 694, and a protruding distal end of the first protrusion 685 or 695 is smaller than an outer diameter of a cable 39. The first protrusion 685 or 695 presses the cable 39 that is disposed in the fourth holder 684 or 694 to hold the cable 39 in the groove.

Figure 4:
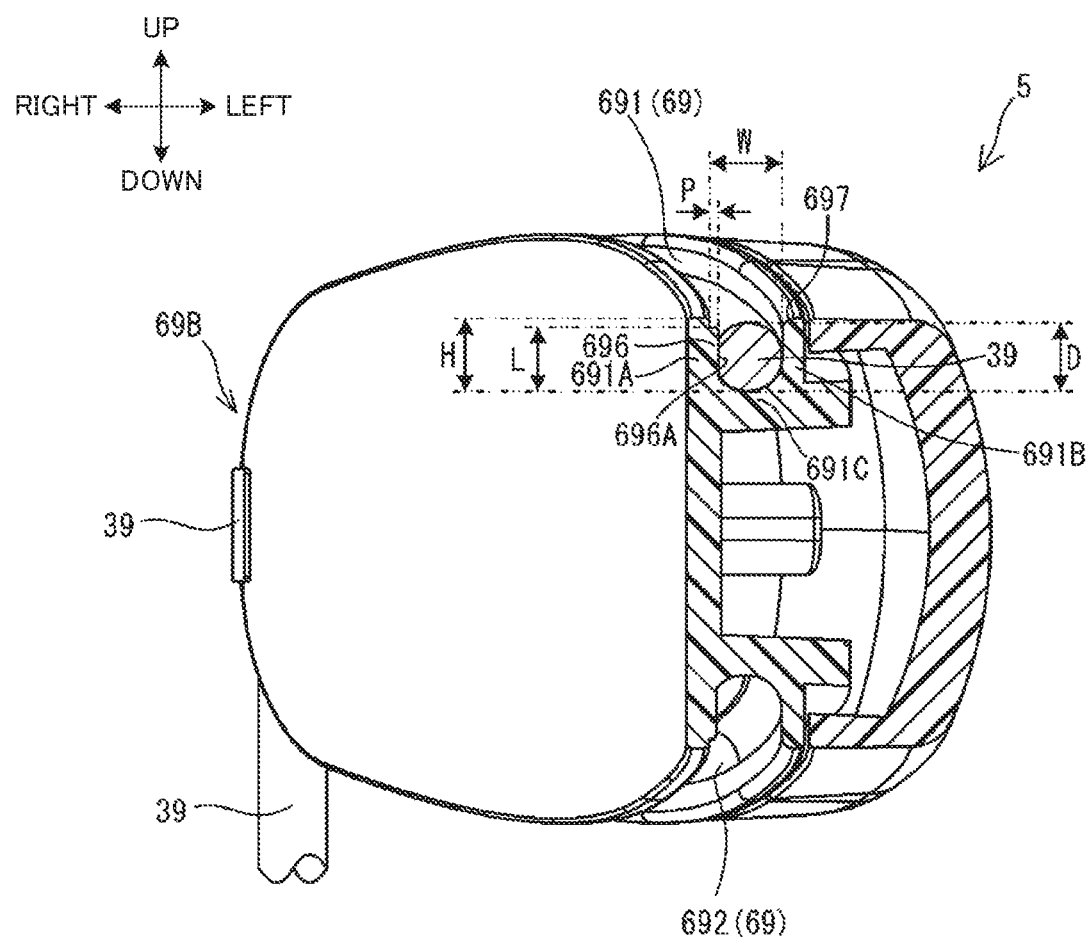
FIG. 4 is a cross-sectional view of a mounting member 5 seen from an arrow direction in one-dot chain line A-A in FIG. 2.

A plurality of the second protrusions 686 are provided in the first holder 681 and the second holder 682, respectively. A plurality of the second protrusions 696 are provided in the first holder 691 and the second holder 692, respectively. As illustrated in FIG. 2 and FIG. 4, the plurality of the second protrusions 696 of the first holder 691 are provided on one side (for example, a side wall 691A), which is close to the region 10 in the groove width direction, of a pair of side walls 691A and 691B of the first holder 691. In First Embodiment, the second protrusions 696 are provided in the first holder 691 at five sites. The five second protrusions 696 are provided on the side wall 691A at approximately equal intervals along the curved shape of the first holder 691. Each of the second protrusions 696 protrudes toward the side wall 691B in the groove width direction. A protruding size P of the second protrusion 696 in the first holder 691 is, for example, 0.3 mm. The second protrusion 696 extends in a depth direction (for example, the up and down direction) of the first holder 691 from a groove bottom 691C of the first holder 691 toward an opening 697 of the first holder 691 along the side wall 691B. A groove width W of the holding section 68 or 69 is, for example, 3.2 mm. The outer diameter D of the cable 39 is, for example, 3.2 mm. That is, the size of a gap between the distal end 696A of the second protrusion 696 and the side wall 691B is smaller than the outer diameter D of the cable 39. Accordingly, in a case where the cable 39 is disposed in the first holder 691, the cable 39 is pressed to the side wall 691B by the second protrusion 696, and thus the cable 39 is held in the first holder 691. In addition, the configuration of each of the second protrusion 696 of the second holder 692, the second protrusion 686 of the first holder 681, and the second protrusion 686 of the second holder 682 is approximately the same as the configuration of the second protrusion 696 of the first holder 691, and description thereof will be omitted.

As illustrated in FIG. 1 to FIG. 3, the cable 39 (refer to FIG. 2) is led out from the image display section 3. The cable 39 electrically connects the image display section 3 to an external device (not illustrated). The cable 39 is wired through the arm 4 and the mounting member 5. The holding sections 68 and 69 hold parts of the cable 39, which is wired in the mounting member 5, in the grooves. The size (for example, the depth) of the holding sections 68 and 69 in the up and down direction is larger than the outer diameter of the cable 39. A depth H (refer to FIG. 4) of the holding sections 68 and 69 is, for example, 3.3 mm. Accordingly, the cable 39 in a state of being held by the holding sections 68 and 69 does not protrude from the opening of the holding sections 68 and 69 to the outside of the groove. The cable 39, which is led out from the image display section 3, is inserted into the holding section 69 on a side (for example, the left side) close to the arm 4 along the arm 4. In First Embodiment, the cable 39 is held in the first holder 691 of the holding section 69. The cable 39 is inserted into the first holder 691 from the front-side end 69A of the holding section 69, and is wired through the inside of the groove. The cable 39 is guided by the first holder 691 toward the rear-side end 69B of the holding section 69. The cable 39 is led out from the end 69B to the outside of the mounting member 5.

The mounting member 5 includes pads 75 to 77 which come into contact with the head of the user during mounting. For example, the pads 75 to 77 are made of an elastic resin such as a silicon resin. The pad 75 is provided on an inner surface 72, which faces the region 10 at the intermediate-front part 53, at a portion including the central position 21 of the mounting member 5 in the right and left direction. During mounting of the HMD 1, the pad 75 comes into contact with the forehead or the frontal region of a user.

The pads 76 and 77 are provided on an inner surface 70 of the right-rear part 55 and an inner surface 71 of the left-rear part 57 of the mounting member 5, respectively. In First Embodiment, the pad 76 is provided on the inner surface 70 in a region ranging from the approximate center of the right-rear part 55 in a direction along the curved shape to the end 62. In First Embodiment, the pad 77 is provided on the inner surface 71 in a region ranging from the approximate center of the left-rear part 57 in a direction along the curved shape to the end 63.

As described above, the mounting member 5 has flexibility. During mounting of the HMD 1, the mounting member 5 is expanded by hands of a user, and thus the end 62 and the end 63 are spaced away from each other in a direction away from the region 10 (for example, toward the right and left direction). In a case where the mounting member 5 is fitted around the head of the user, the pad 75 comes into contact with the forehead or the frontal region of the user, and positioning of the mounting member 5 is performed on the head in the front and rear direction. When the expanded state of the ends 62 and 63 is released, the right-rear part 55 and the left-rear part 57 of the mounting member 5 are pressed toward the region 10. The pads 76 and 77 respectively come into contact with the right temporal region and the left temporal region of the user. The inner surface 70 of the right-rear part 55 presses the right temporal region of the user through the pad 76. Similarly, the inner surface 71 of the left-rear part 57 presses the left temporal region of the user through the pad 77. The right-rear part 55 and the left-rear part 57 of the mounting member 5 press the temporal regions of the user at a pressure sufficient to support the weight of the HMD 1. As described above, in the inner surfaces 70 and 71 which are provided in large areas in the up and down direction, an area that comes into contact with the temporal region of the user is ensured to be larger than that of the inner surface 72 of the intermediate-front part 53. Accordingly, in a case where the mounting member 5 is mounted on the head of the user, the pads 76 and 77 obtain a great frictional force with the head due to an increase in the contact area with the head. When the frictional area is ensured, it is possible to suppress occurrence of a positional deviation of the mounting member 5 in the head.

The mounting sections 58 and 59 are respectively provided at portions between the front-side end 61 of the mounting member 5 in the front and rear direction and both of the ends 64 and 65 of the mounting member 5 in the right and left direction. The position 15A at which the mounting section 58 is provided is located on the right side with respect to the position 21 and on the front side with respect to the position 22. Furthermore, as described above, the position 22 is located at the center of the mounting member 5 in the front and rear direction. The position 15B at which the mounting section 59 is provided is located on the left side with respect to the position 21, and on the front side with respect to the position 22. The mounting sections 58 and 59 are located on the front side with respect to the front-side ends 68A and 69A of the holding sections 68 and 69. The mounting member 5 can mount to the mounting sections 58 and 59 the connection mechanism 8 which connects the mounting member 5 to the arm 4. In First Embodiment, the connection mechanism 8 is mounted in the mounting section 59. The connection mechanism 8 will be described later.

Two holes 58A, which pass through the mounting member 5 in the thickness direction, are formed in the mounting section 58 (refer to FIG. 1). Similarly, two holes (not illustrated), which pass through the mounting member 5 in the thickness direction, are also formed in the mounting section 59. A screw is inserted into each of the holes 58A. The connection mechanism 8 is mounted by screwing to the mounting section 58 or 59. That is, the image display unit 2 can be selectively mounted to one of the mounting section 58 and the mounting section 59. In a case where the image display unit 2 is mounted to the mounting section 58, the image display section 3 is disposed on the right side of the mounting member 5. The image display section 3 can allow image light to be incident on the right eye of the user. In a case where the image display unit 2 is mounted to the mounting section 59, the image display section 3 is disposed on the left side of the mounting member 5. The image display section 3 can allow the image light to be incident on the left eye of the user.

Figure 5:
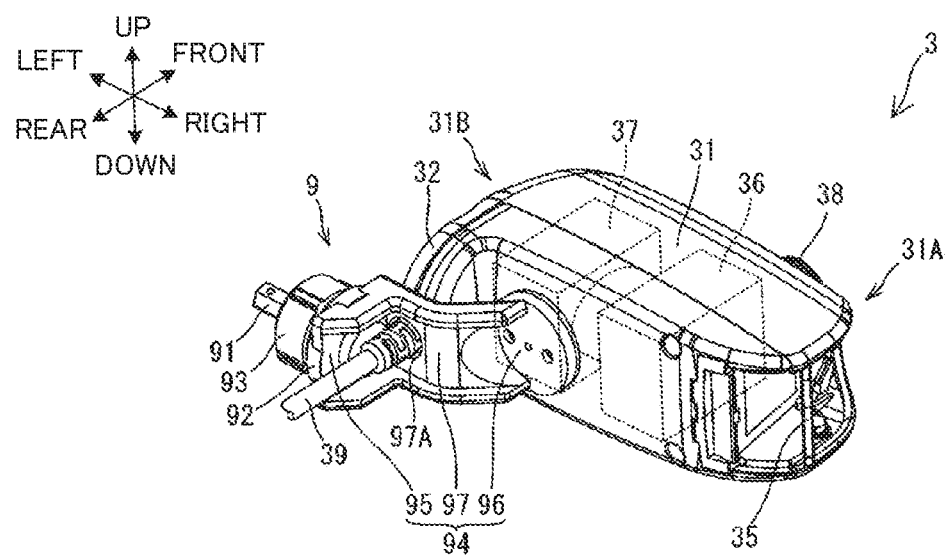
FIG. 5 is a perspective view when an image display section 3 is seen from a rear upper-right side.

As illustrated in FIG. 5, the image display section 3 includes the half mirror 35, a lens unit 36, and an image unit 37 in a casing 31. The casing 31 has an approximately rectangular parallelepiped shape with curved corners. The casing 31 extends to be long in a predetermined direction (for example, the right and left direction). The casing 31 has a hollow box shape. A leading end part 31A, which is one end part in an extension direction of the casing 31, is opened. In addition, a protrusion 32, which protrudes toward a backward side, is formed at a base end part 31B that is the other end of the casing 31. A hole (not illustrated), which passes through the protrusion 32 in the front and rear direction, is formed in a rear end of the protrusion 32. A fixing section 94 of the connection mechanism 9 is connected to a rear surface of the casing 31 at a position on the right side with respect to the protrusion 32 in the base end part 31B. The connection mechanism 9 will be described later.

As illustrated in FIG. 5, the image unit 37 is provided in the casing 31 at the base end part 31B. The image unit 37 includes a liquid crystal panel (not illustrated) and a control substrate (not illustrated) which are known in the related art. The liquid crystal panel displays an image on a left lateral surface thereof and generates image light. The control substrate is disposed on the right side of the liquid crystal panel. The cable 39 is connected to the control substrate. The cable 39 passes through the protrusion 32 and is led out to the outside of the image display section 3 from the hole in a rear end of the protrusion 32. The control substrate receives image data that is transmitted from an external device through the cable 39. The control substrate outputs a control signal to the liquid crystal panel, and displays an image in accordance with the image data on the liquid crystal panel. Furthermore, a two-dimensional display device such as a digital mirror device (DMD) and an organic EL may be used instead of the liquid crystal panel. In addition, a retinal scanning display, which projects two-dimensionally scanned light on a retina of a user, may be used instead of the liquid crystal panel.

The lens unit 36 is provided on a right side of the image unit 37 in the casing 31. The lens unit 36 allows the image light emitted from the image unit 37 to be transmitted therethrough and guides the image light to a leading end part 31A side. The lens unit 36 includes a plurality of lenses (not illustrated). The lens unit 36 is held in the casing 31 so as to be movable in the right and left direction. An operation member 38, which has a truncated cone shape and includes a plurality of depressions and protrusions on a lateral surface, is provided in a front surface of the casing 31. The operation member 38 engages with the lens unit 36 by a groove cam (not illustrated). When the operation member 38 rotates, the lens unit 36 moves toward the leading end part 31A side or a base end part 31B side. When the lens unit 36 moves in the right and left direction, a focal length of the image light, which is emitted from the image unit 37, varies. Accordingly, a user can perform focus adjustment by rotating the operation member 38.

The half mirror 35 is provided in the leading end part 31A. The half mirror 35 has a rectangular plate shape. The half mirror 35 can reflect a part (for example, 50%) of light incident on a reflective surface, and allows the other part of the light to be transmitted therethrough. For example, the reflective surface of the half mirror 35 is formed by depositing a metal such as aluminum and silver on a transparent resin or a glass substrate to have a predetermined reflectivity (for example, 50%). During mounting of the HMD 1, the base end part 31B of the casing 31 is disposed on the left side with respect to the leading end part 31A. That is, the image display section 3 is used in a state of being disposed to extend in the right and left direction. For example, the half mirror 35 is disposed in front of the left eye of the user. The half mirror 35 is fixed to the leading end part 31A in a state in which the reflective surface faces the left side and the rear side. Image light, which is emitted from the image unit 37 in the casing 31, is condensed when being transmitted through the lens unit 36. The condensed image light is incident on the half mirror 35. The half mirror 35 reflects the image light to the rear side to allow the image light to be incident on the left eye of the user. The user can confirm a virtual image based on the image light reflected from the half mirror 35 with the eye. In addition, the half mirror 35 can allow external light, which is incident thereon from the front side, to be transmitted therethrough toward the rear side.

As illustrated in FIGS. 1 to 3, FIG. 6, and FIG. 7, the arm 4 has an approximately rod shape. The arm 4 is made of a resin, a metal, and the like. An upper end part 4A of the arm 4 is connected to the mounting member 5 by the connection mechanism 8. That is, the mounting member 5 is an example of a connection object to which the arm 4 is connected. A lower end part 4B of the arm 4 is connected to the image display section 3 by the connection mechanism 9. The arm 4 holds the image display section 3 at a position that is spaced away from the mounting member 5. As illustrated in FIG. 1, during mounting of the HMD 1, the lower end part 4B of the arm 4 is disposed on a lower side and on a left side of the upper end part 4A. The arm 4 is curved in a convex shape toward an outer side of the region 10. In First Embodiment, the arm 4 is curved in a convex shape toward the left side during mounting of the HMD 1.

Figure 6:
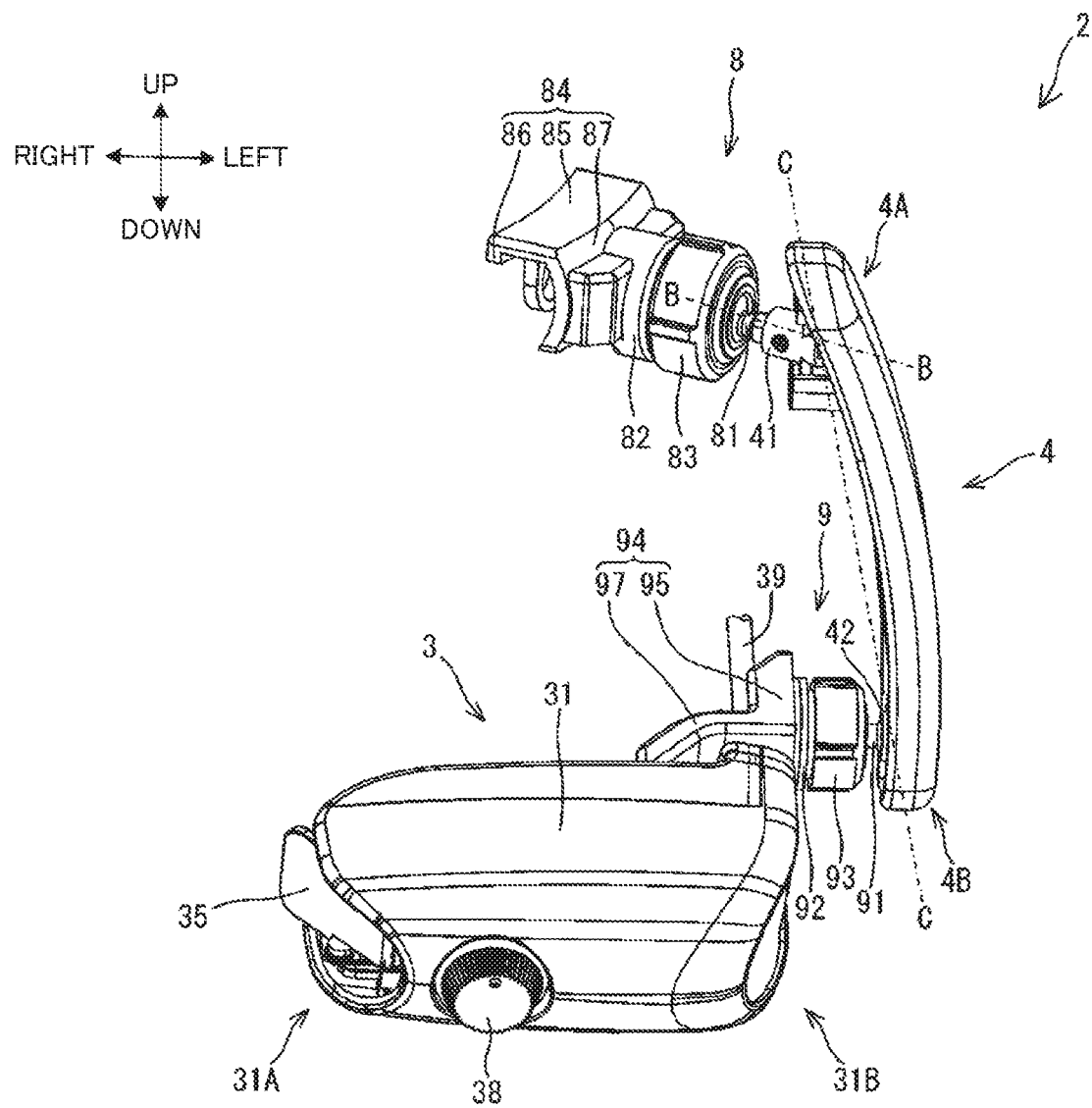
FIG. 6 is a perspective view when an image display unit 2 is seen from a front upper side.
Figure 7:
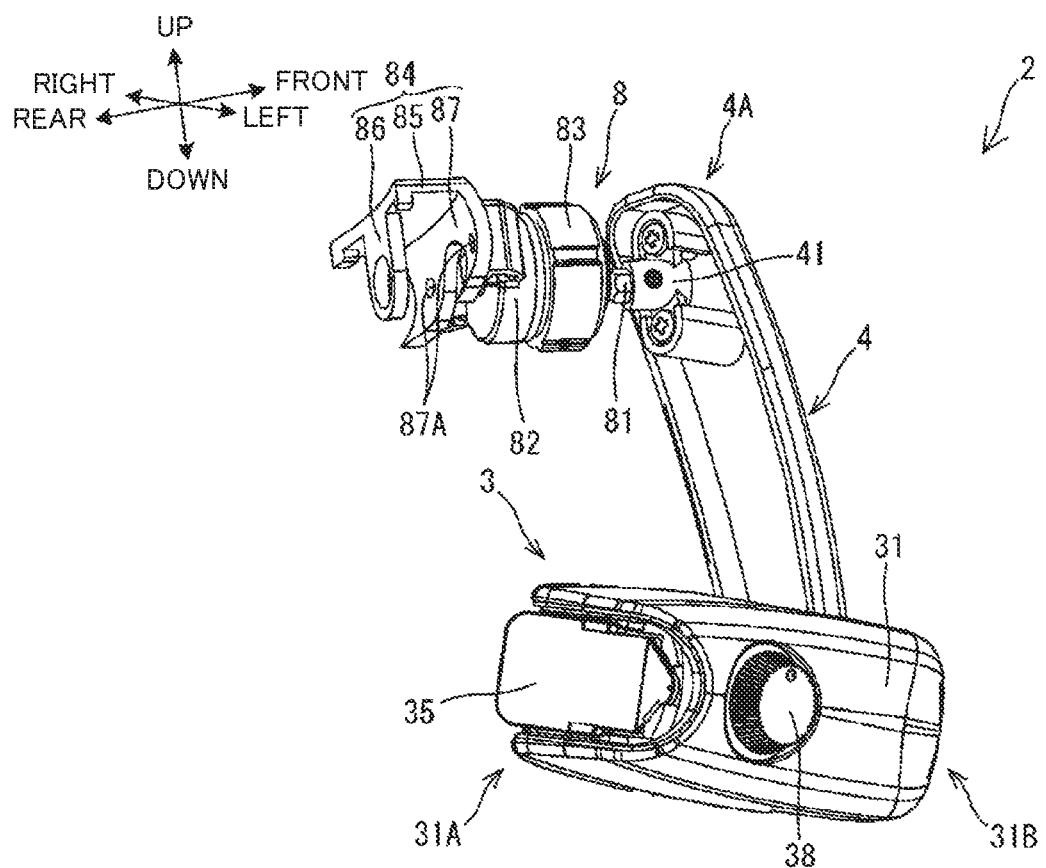
FIG. 7 is a perspective view when the image display unit 2 is seen from a front lower-left side.

As illustrated in FIG. 6 and FIG. 7, the arm 4 includes a connection section 41 at the upper end part 4A. The connection section 41 connects the arm 4 to the connection mechanism 8. The connection section 41 protrudes along a predetermined direction B (refer to FIG. 6) at the upper end part 4A. The direction B is a direction that is inclined with respect to a direction C in which the arm 4 extends from the upper end part 4A to the lower end part 4B. A hole (not illustrated), which extends along the direction B, is formed in the connection section 41. A rod body of a ball stud 81 (to be described later) of the connection mechanism 8 is inserted into the hole. That is, the rod body of the ball stud 81 extends along the direction B. When the rod body is fixed to the connection section 41, the arm 4 is connected to the connection mechanism 8.

The connection mechanism 8 has rotational degrees of freedom of two axes or more. The connection mechanism 8 of First Embodiment is a known ball-joint type movable section. The connection mechanism 8 includes the ball stud 81, a socket accommodation section 82, a fixing nut 83, and a holding section 84. The ball stud 81 is a component in which a rod body is connected to a spherical body. The socket accommodation section 82 has a cylindrical shape, and accommodates a socket (not illustrated), which comes into spherical contact with the spherical body of the ball stud 81, on an inner side thereof. The fixing nut 83 is a lid member that can be fixed onto an opening portion of the socket accommodation section 82 and can be fastened thereto. An insertion hole (not illustrated), into which the rod body of the ball stud 81 is inserted, is formed in the fixing nut 83. In the ball stud 81, a range in which the rod body can move in the insertion hole with the spherical body that comes into contact with the socket as a supporting point, is set as a movable range. As illustrated in FIG. 6, in a case where the shaft of the rod body is located at the center of the insertion hole, the ball stud 81 is located at the center of the movable range. At this time, a direction in which the rod body of the ball stud 81 extends (for example, the direction B in which the connection section 41 extends) matches the following direction A (refer to FIG. 9). That is, the movable range of the ball stud 81 is, for example, in a predetermined solid angle (for example, in a range of a conical surface) in which the direction A is set as the central axis. When the fixing nut 83 is fastened to the socket accommodation section 82, the spherical body is pressed to the socket, and thus positioning of the ball stud 81 is performed with respect to the socket accommodation section 82.

The holding section 84 is provided at an end opposite to the side of the socket accommodation section 82 onto which the fixing nut 83 is fitted. The holding section 84 is a component that mounts the connection mechanism 8 to the mounting sections 58 and 59 of the mounting member 5. The holding section 84 includes an upper wall 85, an inner side wall 86, and an outer side wall 87. The upper wall 85 comes into contact with an upper surface, which faces an upper side during mounting of the HMD 1 on the head, among lateral surfaces of the mounting member 5 at the mounting section 58 or 59. The inner side wall 86 comes into contact with an inner surface, which faces the inside of the region 10, among the lateral surfaces of the mounting member 5 at the mounting section 58 or 59. The outer side wall 87 comes into contact with an outer surface, which is opposite to the inner surface that faces the inside of the region 10, among the lateral surfaces of the mounting member 5 at the mounting section 58 or 59. Two holes 87A (refer to FIG. 7) are formed in the outer side wall 87. When the holding section 84 is mounted to the mounting section 58 or 59, the holding section 84 is disposed at the mounting section 58 or 59 from an upper side of the mounting section 58 or 59 so that the mounting section 58 or 59 is interposed between the inner side wall 86 and the outer side wall 87. When a screw, which is inserted into the hole 58A and the hold 87A, is fastened to a nut (not illustrated), the holding section 84 is fixed to the mounting section 58 or 59.

The arm 4 includes a connection section 42 at the lower end part 4B. The connection section 42 connects the arm 4 to the connection mechanism 9. At the lower end part 4B, the connection section 42 protrudes along the right and left direction. A hole (not illustrated) is also formed in the connection section 42. A rod body of a ball stud 91 (to be described later) of the connection mechanism 9 is inserted into the hole. That is, the rod body of the ball stud 91 extends along the direction B. When the rod body is fixed to the connection section 42, the arm 4 is connected to the connection mechanism 9.

The connection mechanism 9 has rotational degrees of freedom of two axes or more. As illustrated in FIG. 5 and FIG. 6, the connection mechanism 9 of First Embodiment is a known ball-joint type movable section similar to the connection mechanism 8. The connection mechanism 9 includes a ball stud 91, a socket accommodation section 92, a fixing nut 93, and a fixing section 94. The configurations of the ball stud 91, the socket accommodation section 92, and the fixing nut 93 are the same as in the connection mechanism 8. In a case where a shaft of the rod body of the ball stud 91 is located at the center of an insertion hole (not illustrated) of the fixing nut 93, the ball stud 91 is located at the center of a movable range. At this time, a direction in which the rod body of the ball stud 91 extends (for example, a direction B in which the connection section 42 extends) matches the direction A (to be described later). That is, for example, the movable range of the ball stud 91 is also in a predetermined solid angle (for example, in a range of a conical surface) in which the direction A is set as the central axis.

The fixing section 94 is provided at an end (for example, an end on a right side of the socket accommodation section 92) opposite to a side of the socket accommodation section 92 onto which the fixing nut 93 is fitted. The fixing section 94 is a component that fixes the connection mechanism 9 to the image display section 3. The fixing section 94 includes a first fixing section 95, a second fixing section 96, and a step-shaped connection section 97. The first fixing section 95 is connected to the socket accommodation section 92. The first fixing section 95 is located on a rear side of the protrusion 32. A left end of the first fixing section 95, to which the socket accommodation section 92 is connected, is located on a slightly left side with respect to the left end of the protrusion 32. The second fixing section 96 is located on the front side and on the right side with respect to the first fixing section 95. The second fixing section 96 is located on a rear surface of the image display section 3 on the right side of the protrusion 32. The second fixing section 96 is connected to the image display section 3. For example, the second fixing section 96 is connected to the base end part 31B of the image display section 3 on the rear side with respect to the half mirror 35 in the front and rear direction. The step-shaped connection section 97 connects the first fixing section 95 to the second fixing section 96 in a step shape. The step-shaped connection section 97 extends from a front-side portion of the first fixing section 95 across a rear end of the protrusion 32 in the right and left direction. The step-shaped connection section 97 further extends on a right side of the protrusion 32 along the protrusion 32 to a left-side portion of the second fixing section 96. In a portion in which the step-shaped connection section 97 passes across the rear end of the protrusion 32, a hole 97A, which passes through the portion in the front and rear direction, is formed. The cable 39, which is led out from the hole in the rear end of the protrusion 32, is inserted into the hole 97A.

When the image display unit 2 is mounted to the mounting section 58 and the connection mechanisms 8 and 9 are located at the centers of the movable ranges respectively, the HMD 1 having the above-described configuration shows the following aspect. As illustrated in FIG. 1 and FIG. 2, in a plan view, the connection mechanism 8 is provided to protrude to an outer side of the region 10 with respect to the mounting member 5. The upper end part 4A of the arm 4 is connected to the connection mechanism 8 on an outer side of the region 10 with respect to the connection mechanism 8. The lower end part 4B of the arm 4 is disposed on a lower side of the upper end part 4A. The connection mechanism 9 is connected to the base end part 31B of the image display section 3 on the rear side of the image display section 3. The casing 31 of the image display section 3 is disposed to extend in the right and left direction, and thus the leading end part 31A is disposed on the right side of the base end part 31B. The half mirror 35 is disposed in front of a left eye of a user.

Figure 8:
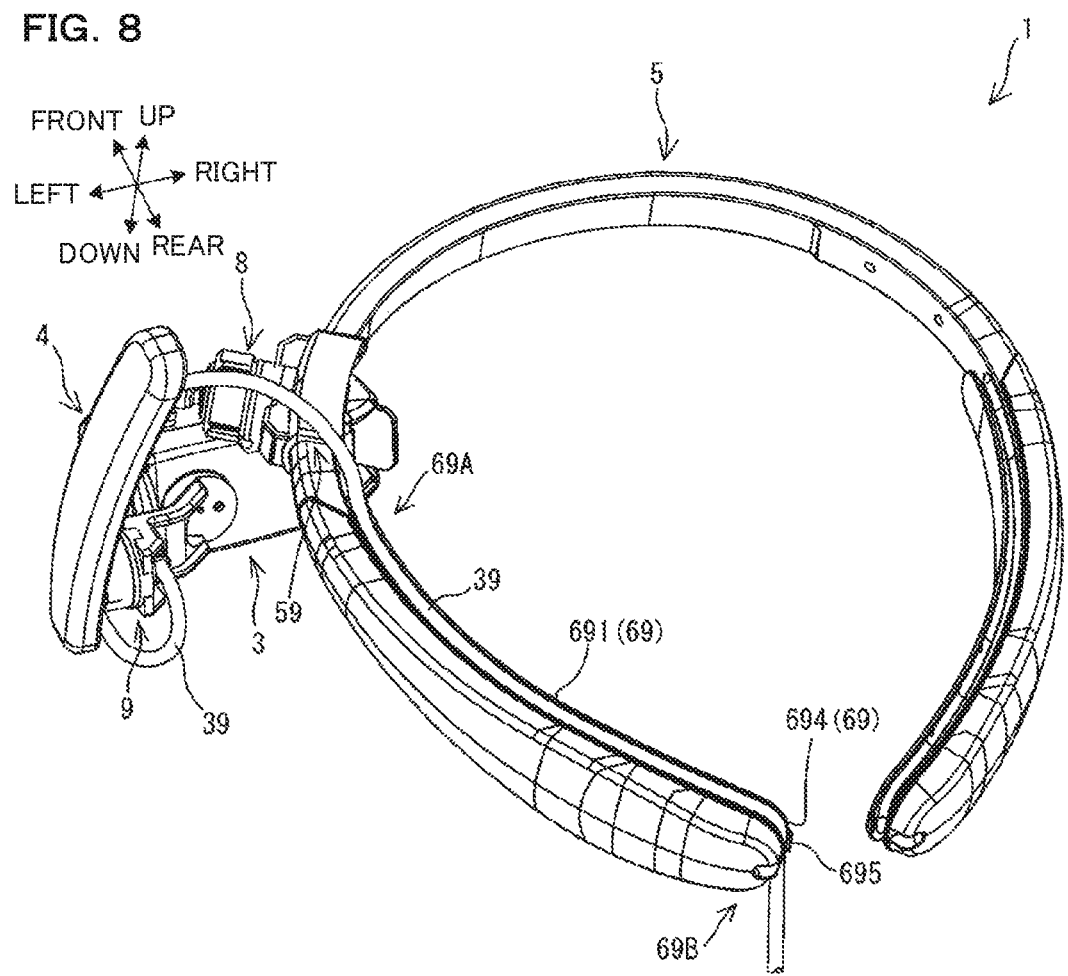
FIG. 8 is a perspective view when the HMD 1, in which a cable 39 is held by a holding section 69, is seen from a rear upper-left side.

As illustrated in FIG. 8, the cable 39, which is led out from the image display section 3, is wired along the arm 4 on an upper side of the mounting member 5 in the mounting section 59. The cable 39 is wired in the first holder 691 at the front-side end 69A of the holding section 69. As described above, the first position, at which the end 69A is disposed, is the position 17 of the left-side end 65 of the mounting member 5. Accordingly, in the HMD 1, the cable 39 can extend from the mounting section 59 toward the rear side as is, and can be wired in the first holder 691.

As illustrated in FIG. 2, the first position, at which the end 69A is disposed, is a position on the rear side with respect to the position 25 of the center of gravity of the HMD 1 in a state in which the cable 39 is not held by the holding section 69. In addition, the positions 15A and 15B of the mounting sections 58 and 59 to which the image display unit 2 can be mounted are located on the front side with respect to the position 25 of the center of gravity. The position 25 of the center of gravity of the HMD 1 is a position of a point on which the resultant force of gravity that acts on respective portions of the HMD 1 is considered to act. The position 25 of the center of gravity varies depending on a mutual positional relationship among the mounting member 5, the arm 4, and the image display section 3. Accordingly, in First Embodiment, a reference is set to the position 25 of the center of gravity of the HMD 1 in a case where the cable 39 is not held by the holding section 69 and the ball studs 81 and 91 of the connection mechanisms 8 and 9 are disposed at the centers of the movable ranges respectively. The position 25 of the center of gravity is obtained as follows. For example, the HMD 1 is suspended with thread that is attached to an arbitrary position of the mounting member 5, and a direction of an extended line of the thread is recorded. In addition, the HMD 1 is suspended with thread that is attached to an arbitrary position that is different from the tip of the mounting member, and a direction of an extended line of the thread is recorded. A position of the intersection of the two extended line which are recorded is obtained, and the position is set as the position 25 of the center of gravity of the HMD 1. It is preferable that the position 25 of the center of gravity of the HMD 1, which is obtained in this manner, is located on the left side with respect to the central position 21 in the right and left direction, and on the front side with respect to the central position 22 in the front and rear direction in a plan view as illustrated in FIG. 2.

The weight of the image display section 3 and the arm 4 is added to the position 15B of the mounting member 5 to which the arm 4 is connected. The position 15B is located on the front side with respect to the holding section 69, and a moment, which downwardly rotates the front side of the HMD 1 with respect to the position 25 of the center of gravity, acts to the HMD 1 due to the weight of the image display section 3 and the arm 4. The first position is located on the rear side with respect to the position 25 of the center of gravity. Accordingly, in a case where the cable 39 is held by the holding section 69, the weight of the cable 39 is added to a portion of the HMD 1 on the rear side with respect to the position 25 of the center of gravity, and thus a moment, which downwardly rotates the rear side of the HMD 1, increases. Accordingly, the moment, which acts on the HMD 1 due to the weight of the image display section 3 and the arm 4, is reduced. According to this, the HMD 1 can improve weight balance, and it is possible to suppress sliding-down of the image display section 3 and the arm 4 from the forehead due to the weight thereof. Furthermore, in a case where the image display unit 2 is mounted at the position 15A, the cable 39 is held by the holding section 68, and thus the moment, which acts on the HMD 1 due to the weight of the image display section 3 and the arm 4, can be reduced. The reason for this is the same as described above.

Furthermore, it is preferable that a distance between the first position and the mounting section 59 which are spaced away from each other is equal to or larger than the minimum bend radius that is determined by physical values of the cable 39. The length is preferably a length that is closer to the minimum bend radius. As the length between the first position and the mounting section 59 which are spaced away from each other is shorter, it is difficult to hook the cable 39 during putting-on, taking-off or using of the HMD 1. In a case where the length between the first position and the mounting section 59 which are spaced away from each other is shorter than the minimum bend radius, there is a possibility that a bending load may be applied to the cable 39.

As illustrated in FIG. 4, the outer diameter D of the cable 39 that is wired in the first holder 691 is smaller than the depth H of the first holder 691. Accordingly, the cable 39, which is wired in the first holder 691, does not protrude from the opening 697 of the first holder 691. In addition, the outer diameter D of the cable 39 is larger than the size of a gap between the distal end 696A of the second protrusion 696 and the side wall 691B. Accordingly, the cable 39, which is wired in the first holder 691, is pressed to the side wall 691B by the second protrusion 696. The second protrusions 696 are provided in the first holder 691 at five sites, and the five first holders 691 are disposed at approximately equal intervals along the curved shape of the first holder 691. That is, the cable 39 is partially pressed by the second protrusions 696 instead of being pressed over the entire length of the first holder 691. Accordingly, the first holder 691 is less likely to apply a load to the cable 39 during holding of the cable 39.

The trapezoidal protrusion 67 protrudes toward the region 10 at the left-side part 52. In a case where the cable 39 is wired in the first holder 691, typically, the cable 39 is fitted from the inside of the region 10 into first holder 691 by user's fingers inserted into the region 10. That is, when the cable 39 is fitted into the first holder 691, the cable 39 is pressed toward the lower side and from the inside of the region 10 toward an outer side. The second protrusion 696 is provided on the side wall 691A that is close to the region 10. Accordingly, the cable 39 is pressed toward the lower side and from the inside of the region 10 toward the outer side, and thus the cable 39 easily climb over the second protrusion 696, and is wired in the first holder 691. In a case where the second protrusion 696 is provided on the side wall 691B, the cable 39 is pressed with respect to the second protrusion 696 when the cable 39 is pressed toward the lower side and from the inside of the region 10 toward the outer side. Accordingly, when the cable 39 is pressed by the fingers inserted into the region 10, fitting of the cable 39 into the first holder 691 may be more difficult in the case where the second protrusion 696 is provided on the side wall 691B in comparison to the case where the second protrusion 696 is provided on the side wall 691A.

A length L of the second protrusion 696, which extends from the groove bottom 691C of the first holder 691 toward the opening 697, is at least equal to or larger than the radius (=D/2) of the cable 39. Accordingly, in a state in which the cable 39 comes into contact with the groove bottom 691C, the second protrusion 696 can come into contact with the cable 39 at a position that is spaced away toward the opening 697 by the radius (=D/2) of the cable 39 or more from the groove bottom 691C. In other words, it is possible to maintain a state in which the second protrusion 696 comes into contact with the cable 39 at a position that is closer to the opening 697 in the depth direction with respect to the largest portion of the cable 39 in a groove width direction.

As illustrated in FIG. 8, the cable 39 is wired toward the rear-side end 69B of the holding section 69 in a state of being held in the first holder 691. The first holder 691 is provided with the opening 697 on the upper side of the mounting member 5, and thus the cable 39 can be accommodated in the gravity direction, and thus it is possible to prevent detachment of the cable 39 due to gravity. The cable 39 is wired from the inside of the first holder 691 to the inside of the fourth holder 694. The first protrusion 695, which protrudes from one end of the fourth holder 694, presses the cable 39 at an opening of the fourth holder 694 and holds the cable 39 in the fourth holder 694. A position, at which the cable 39 is pressed by the first protrusion 695, is a position at which the cable 39 is led out from the inside of the fourth holder 694 to the outside. The fourth holder 694 is opened on the rear lateral surface of the trapezoidal protrusion 67, and is connected to the first holder 691. The first protrusion 695 presses the back of the cable 39 toward the front side. Accordingly, when the cable 39 is wired from the inside of the first holder 691 to the inside of the fourth holder 694, the cable 39 is guided to the first protrusion 695, and is bent in a direction that extends toward a lower side of the mounting member 5 along the shape of the fourth holder 694. In this manner, in the HMD 1, the cable 39, which extends from the mounting section 59 to the rear side through the arm 4, can be wired from the front-side end 69A to the inside of the holding section 69, and can be hung from the rear-side end 69B to the lower side of the mounting member 5. In the HMD 1, the cable 39 is held in the holding section 69, and thus it is easy to remove the cable 39.

As described above, the configuration of the first holder 691 of the holding section 69 and the configuration of the second holder 692 of the holding section 69 are approximately the same as each other. Accordingly, in a case where the connection mechanism 8 of the image display unit 2 is connected to the mounting section 59 in a state in which the up and down direction of the mounting member 5 is inverted, in the HMD 1, it is possible to wire the cable 39 in the second holder 692 in the same manner as in the first holder 691. In addition, the mounting member 5 includes a pair of the mounting sections 58 and 59. In addition, the configuration of the first holder 691 of the holding section 69 and the configuration of the first holder 681 of the holding section 68 are approximately the same as each other. Accordingly, in a case where the connection mechanism 8 of the image display unit 2 is connected to the mounting section 58, in the HMD 1, it is possible to wire the cable 39 in the first holder 681 in the same manner as in the first holder 691. In addition, the configuration of the first holder 691 of the holding section 69 and the configuration of the second holder 682 of the holding section 68 are approximately the same as each other. Accordingly, in a case where the connection mechanism 8 of the image display unit 2 is connected to the mounting section 58 in a state in which the up and down direction of the mounting member 5 is inverted, in the HMD 1, it is possible to wire the cable 39 in the second holder 682 in the same manner as in the first holder 691.

As described above, the cable 39 is held by the holding section 68 and 69 from the first position to the second position on an occipital region side. Accordingly, it is possible to reduce a gap that occurs between the cable 39 and the mounting member 5. As a result, the cable 39 is less likely to be hooked or rolled during putting-on, taking-off or using of the HMD 1, and thus the cable 39 is less likely to be removed from the mounting member 5. On the other hand, in a case of removing the image display section 3 and the arm 4 from the mounting member 5, it is possible to simply remove the cable 39 from the mounting member 5 by only taking out the cable 39 from the groove.

Since the holding sections 68 and 69 extend to the rear-side ends 62 and 63 of the mounting member 5, the cable 39, which is held by the holding sections 68 and 69, is less likely to be hooked or rolled during putting-on, taking-off, or in use of the HMD 1, and is less likely to be removed from the mounting member 5.

At the rear-side ends 62 and 63, the mounting member 5 can press the cable 39 into the holding sections 68 and 69 by the first protrusions 685 and 695. The cable 39 is less likely to be removed from the mounting member 5 due to the first protrusions 685 and 695. In addition, the first protrusions 685 and 695 presses the cable 39 at a position at which the cable 39 is led out from the holding sections 68 and 69, and thus it is possible to guide a lead-out portion of the cable 39 toward the lower side of the mounting member 5 during wearing of the HMD 1.

In a case where the first position is located on the front side with respect to the mounting sections 58 and 59 of the arm 4, the cable 39, which extends through the arm 4, extends from the mounting sections 58 and 59 toward the front side once, is folded to the rear side, is held by the holding sections 68 and 69 from the first position, and is wired in a route extending toward the rear side of the mounting member 5. In this case, there is a possibility that a gap may occur between the cable 39 and the mounting member at a folding portion of the cable 39. Due to the gap, the cable is likely to be hooked or rolled in a head portion such as the hair and the ear of the user, or a temple and the like when the user wears eyeglasses, and thus the cable may be detached from the mounting member 5. When the first position is located on the rear side with respect to the mounting sections 58 and 59 of the arm 4, the cable 39, which extends through the arm 4, extends from the mounting sections 58 and 59 to the rear side, is held as is by the holding sections 68 and 69 from the first position, and is wired in a route extending toward the rear side of the mounting member 5. Accordingly, it is possible to reduce a possibility that the cable 39 is removed from the mounting member 5.

The weight of the image display section 3 and the arm 4 is added to the position 15B of the mounting member 5 to which the arm 4 is connected. The position 15B is located on the front side with respect to the holding section 69. Accordingly, a moment, which downwardly rotates the front side of the HMD 1 with respect to the position 25 of the center of gravity, acts on the HMD 1 due to the weight of the image display section 3 and the arm 4. In a case where the cable 39 is held by the holding section 69, the weight of the cable 39 is added to a portion of the HMD 1 on the rear side with respect to the position 25 of the center of gravity, and thus a moment, which downwardly rotates the rear side of the HMD 1, increases. Accordingly, the moment, which acts on the HMD 1 due to the weight of the image display section 3 and the arm 4, is reduced. Accordingly, the HMD 1 can improve weight balance, and it is possible to suppress sliding-down of the image display section 3 and the arm 4 from the forehead due to the weight thereof.

The holding sections 68 and 69 are formed on an circular inner side of the mounting member 5 having an opened circle shape, and thus the cable 39, which is held by the holding sections 68 and 69, is less likely to be hooked from an outer side of the mounting member 5, and the cable 39 is less likely to be removed from the mounting member 5.

The holding sections 68 and 69 are respectively provided at the right-side part 51 and the left-side part 52 of the mounting member 5. In a case where a connection destination of the arm 4 is changed, for example, from the left-side mounting section 59 to the right-side mounting section 58 in the right and left direction of the mounting member 5, it is possible to hold the cable 39 in the holding section 68 that is close to the mounting section 58 after the changing.

The holding sections 68 and 69 are provided with an opening on an upper side in a direction when the mounting member 5 is used. Accordingly, in the HMD 1, it is possible to prevent the cable 39 from being removed from the holding sections 68 and 69 due to gravity.

In the HMD 1, the arm 4 can be inverted to a third direction (for example, the up and down direction). That is, the image display section 3 can be moved by the connection mechanism 8 with respect to the mounting member 5 from the lower side to the upper side through the arm 4. In a case where the mounting member 5 is mounted in a state of being inverted in the up and down direction, in the HMD 1, disposition of the image display section 3 can be switched from a left eye side to a right eye side. The holding sections 68 and 69 are provided with the first holders 681 and 691 and the second holders 682 and 692, respectively. Even when the mounting member 5 is used in the state of being inverted in the up and down direction, in the HMD 1, for example, holding of the cable 39 is changed from the first holders 681 and 691 to the second holders 682 and 692, and thus it is possible to prevent the cable 39 from being removed from the holding sections 68 and 69 due to gravity.

The cable 39 does not protrude from the holding sections 68 and 69 in a state of being held by the holding sections 68 and 69, and thus the cable 39 is less likely to be hooked or rolled during putting-on, taking-off or using of the HMD 1, and is less likely to be removed from the mounting member 5.

The second protrusions 686 and 696 can press the cable 39 in the holding sections 68 and 69. Accordingly, the cable 39 is less likely to be removed from the mounting member 5.

In a case where the second protrusions 686 and 696 are provided to be close to the openings of the holding sections 68 and 69, there is a possibility that the cable 39 does not come into contact with the second protrusions 686 and 696. In this case, the cable 39 may come into contact with the second protrusions 686 and 696 whenever the cable 39 moves in the holding sections 68 and 69 due to vibration and the like, and the a coated portion may be abraded. In First Embodiment, the second protrusions 686 and 696 can maintain a state of coming into contact with the cable 39 in a state in which the cable 39 comes into contact with the groove bottom. Accordingly, in the HMD 1, it is possible to prevent the cable 39 from being abraded, and it is possible to prevent the cable 39 from being removed from the holding sections 68 and 69.

At least a part of the mounting member 5 is curved, and thus it is possible to reduce a gap between the mounting member 5 and the head along a curved shape of the head. Since the gap between the mounting member 5 and the head is small, it is possible to reduce a possibility that a portion, which is not held by the holding sections 68 and 69, of the cable 39 is disposed between the mounting member 5 and the head. Accordingly, the cable 39 is less likely to be hooked or rolled in the gap between the mounting member 5 and the head during using, and the cable 39 is less likely to be removed from the mounting member 5.

Second Embodiment

In the above-described First Embodiment, the cable 39 is not fixed to the arm 4. Accordingly, for example, when the arm 4 rotates, there is a possibility that the cable 39 may be entangled with the arm 4 or the cable 39 may block a visual field of a user. Accordingly, there is a possibility that the cable may disturb the user.

On the other hand, in a case where the cable is disposed inside the arm similar to a configuration described in Japanese Patent Laid-Open Publication No. 2008-148028, the cable and the arm are fixed to each other, and thus the cable does not disturb the user. However, when considering a case where the image display section is removed from the arm, since the cable is disposed inside the arm, there is a possibility that a process of attaching or detaching the arm to or from the image display section may be complicated.

According to another aspect of the present disclosure, there are provided a head-mounted display and an image display unit in which attachment and detachment of the arm and the image display section are easy and thus the cable does not disturb the user.

Hereinafter, description will be given of Second Embodiment with reference to FIG. 9 to FIG. 15. Generally, Second Embodiment is different from First Embodiment in a structure of the arm.

Figure 9:
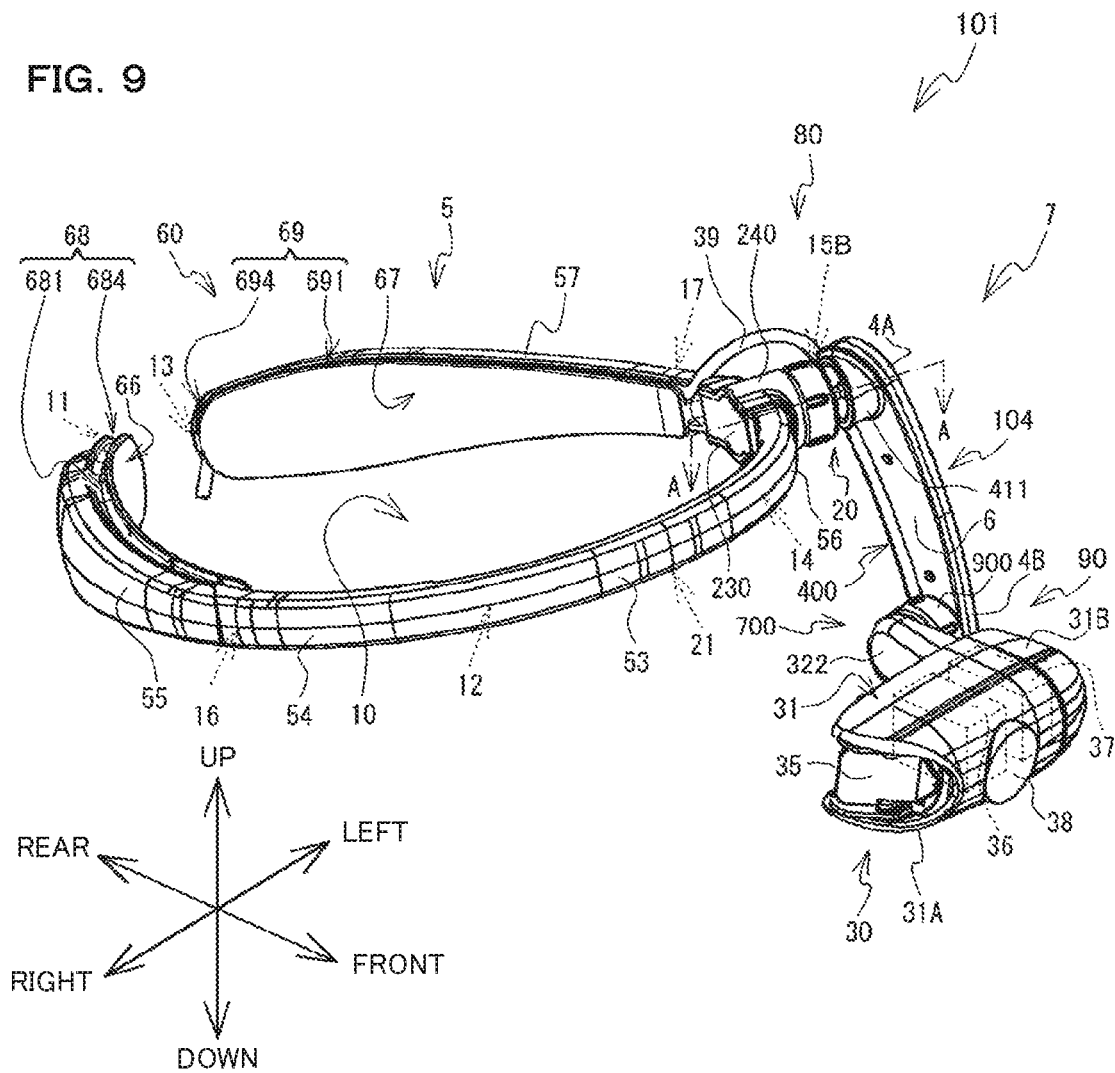
FIG. 9 is a perspective view when an HMD 101 according to Second Embodiment is seen from a right-front side.
Figure 10:
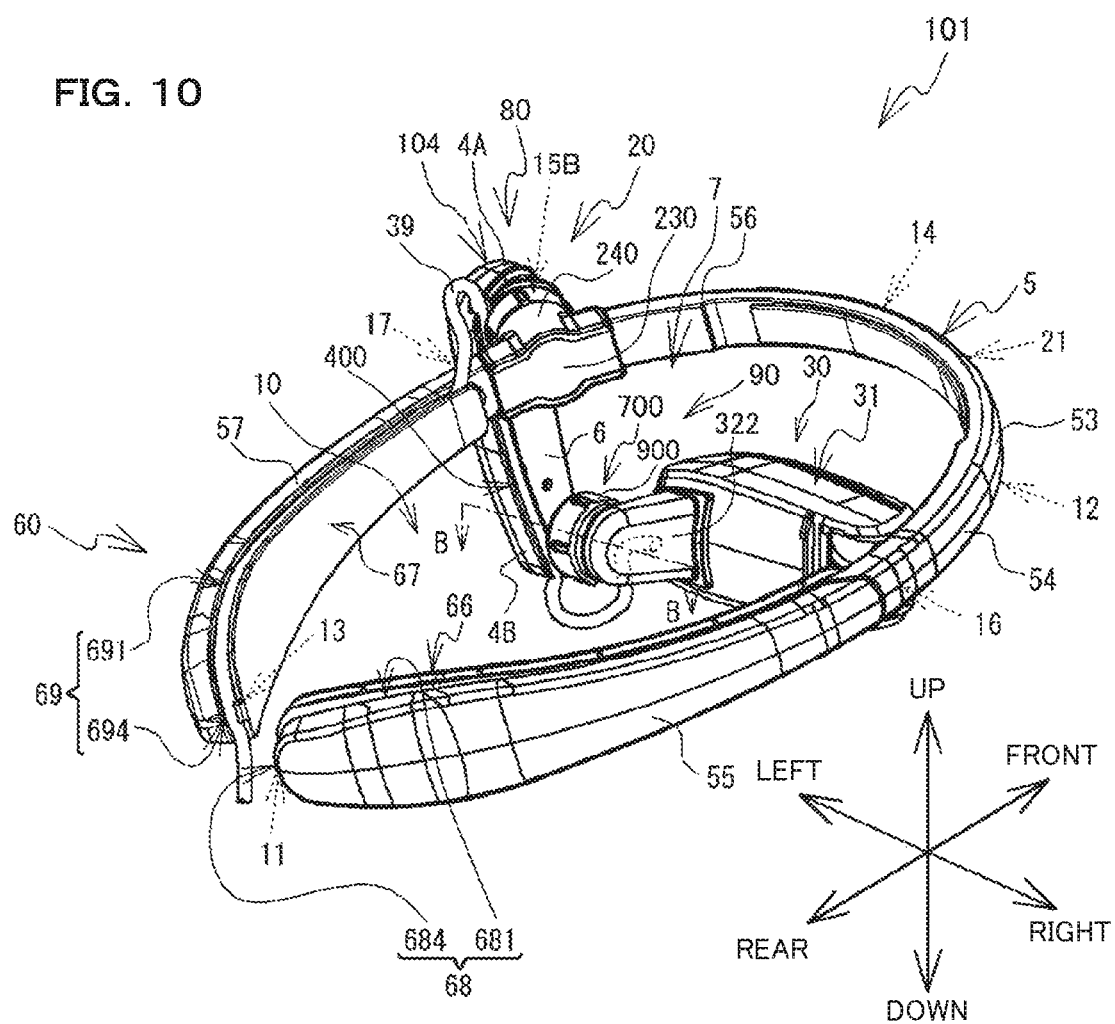
FIG. 10 is a perspective view when the HMD 101 is seen from a right-rear side.
Figure 11:
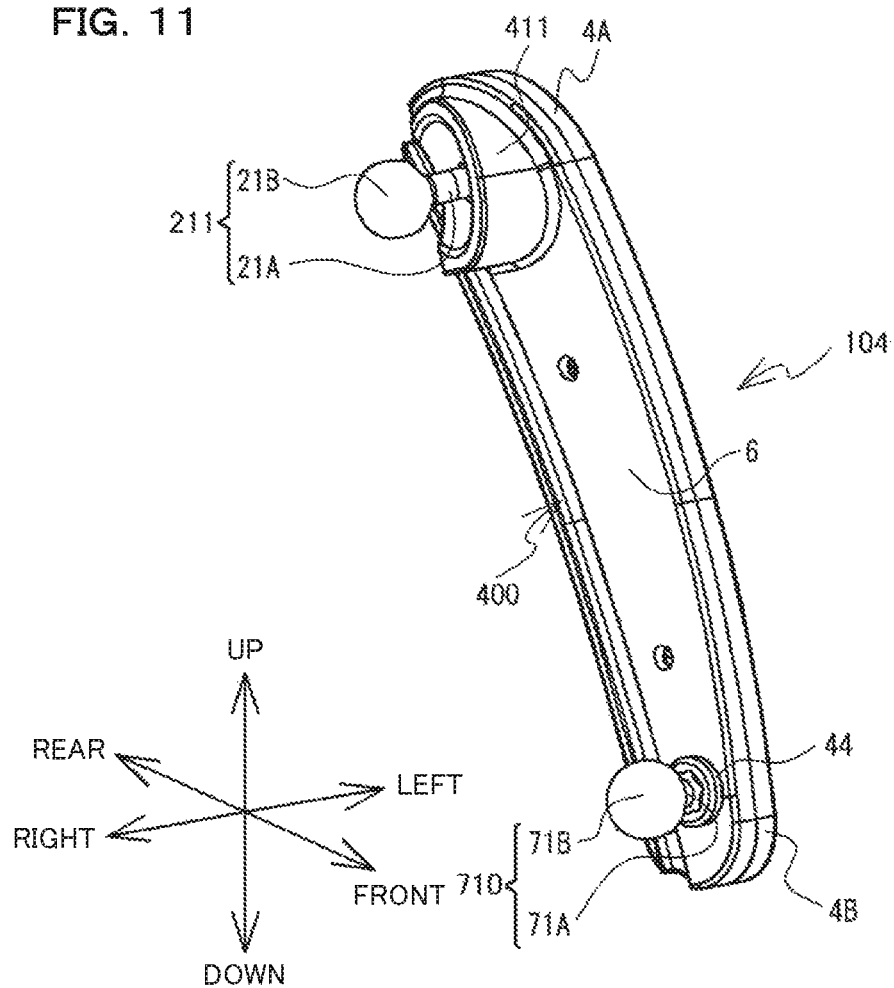
FIG. 11 is a perspective view of an arm 104.

As illustrated in FIG. 9 to FIG. 11, as is the case with the HMD 1 in First Embodiment, an HMD 101 is an optical transmission type HMD that can be mounted on a head of a user. Furthermore, in the HMD 101, the same reference numeral will be given to the same configuration as in the HMD 1, and description thereof will be omitted. The HMD 101 comprises a mounting member 5 and an image display unit 7. The mounting member 5 can be mounted on the head of the user. The mounting member 5 includes a first cable holding section 60. The first cable holding section 60 holds a cable 39. The image display unit 7 can be mounted to or detached from the mounting member 5.

As illustrated in FIG. 9 and FIG. 10, the mounting member 5 in Second Embodiment has the same configuration as that of the mounting member 5 (refer to FIGS. 1 to 4, and FIG. 8) in First Embodiment. The first cable holding section 60 includes holding sections 68 and 69. The holding sections 68 and 69 in Second Embodiment have the same configurations as those of the holding sections 68 and 69 (refer to FIGS. 1, 2, 4, and 8) in First Embodiment. Furthermore, in Second Embodiment, the pads 75 to 77 are not illustrated in the drawings.

The image display unit 7 will be described with reference to FIG. 9 to FIG. 13. The image display unit 7 includes an arm 104, a connection mechanism 80, an image display section 30, a connection mechanism 90, a second cable holding section 400, and a cable 39. As is the case with the connection mechanisms 8 and 9 in First Embodiment, the connection mechanisms 80 and 90 are known ball-joint type movable mechanisms. The arm 104 can rotate by the connection mechanism 80. The image display section 30 can rotate by the connection mechanism 90. That is, a relative position of the image display unit 7 with respect to the mounting member 5 can be displaced in accordance with a use state of the HMD 101. In the following description, description will be given of a configuration of the image display unit 7 at a use position for convenience. The use position is a position at which the image display unit 7 is disposed in a case where the HMD 101 mounted on the head emits image light to an eye of a user. As an example, a use position of the image display unit 7 in Second Embodiment is a position at which a half mirror 35 is disposed in front of a left eye of the user. In addition, FIG. 9 and FIG. 10 illustrate the image display unit 7 that is in the use position. In addition, in FIGS. 11 to 13, the cable 39 is not illustrated.

As illustrated in FIG. 9 to FIG. 11, the arm 104 has an approximately rod shape. The arm 104 is disposed on the left side with respect to the mounting member 5. The arm 104 is made of a resin, a metal, and the like. One end part 4A of the arm 104 is rotatably connected to the mounting member 5 by the connection mechanism 80 to be described later. The other end part 4B of the arm 104 is rotatably connected to the image display section 30 by the connection mechanism 90 to be described later.

The arm 104 extends in a direction (for example, the up and down direction) that intersects the front and rear direction at the use position in a state of being seen from the front side. More specifically, the arm 104 extends in a direction in which a lower end is inclined to the front side with respect to the up and down direction. The arm 104 is provided with an inner surface 6. The inner surface 6 is a right surface of the arm 104. The inner surface 6 faces a direction (for example, the right direction) extending from the arm 104 toward the mounting member 5 and the half mirror 35.

Figure 12:
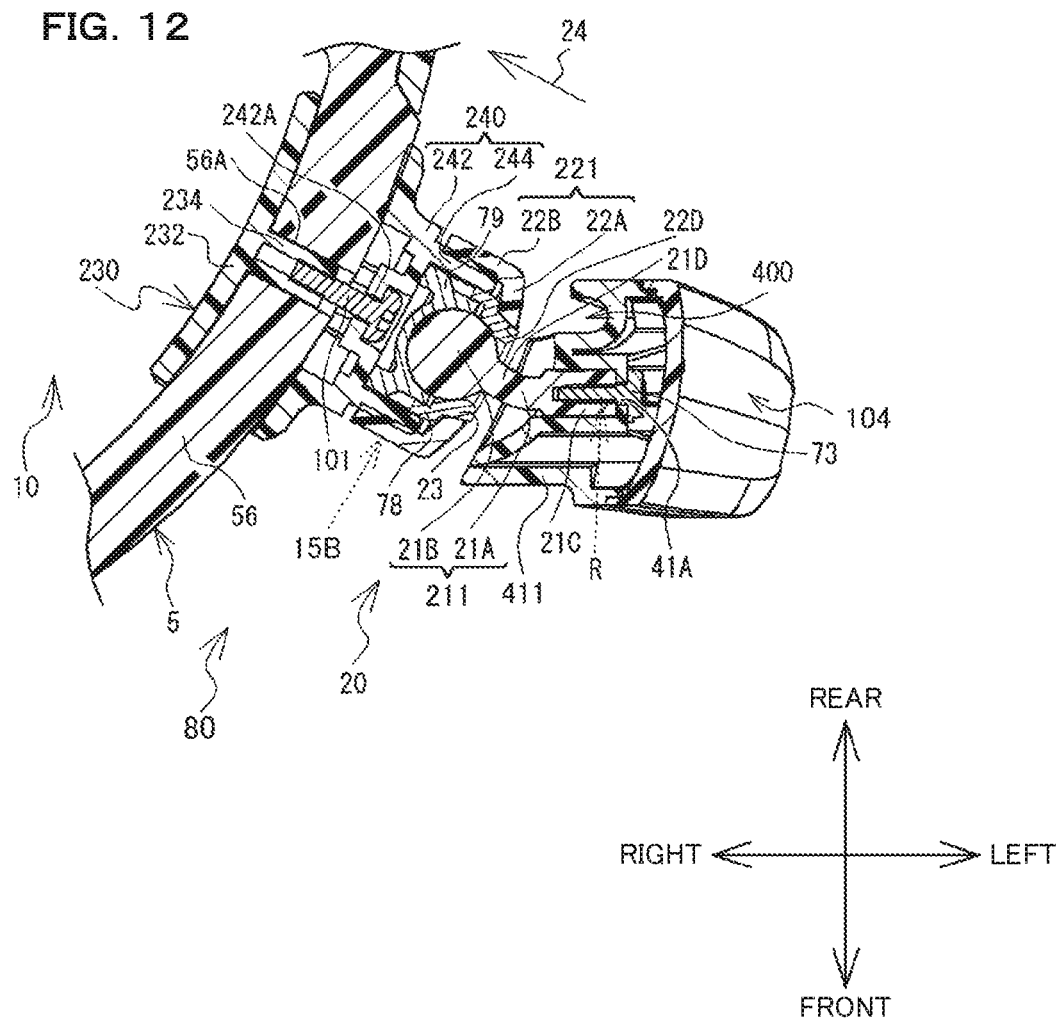
FIG. 12 is a cross-sectional view of a connection mechanism 80 that is seen from an arrow direction in line A-A in FIG. 9.

As illustrated in FIG. 12, the connection mechanism 80 connects the mounting member 5 to the arm 104. The connection mechanism 80 includes an inner-side mounting member 230, an outer-side mounting member 240, and a first ball joint 20. The inner-side mounting member 230 is a plate-shaped member that is mounted to an inner surface of the left-front part 56. The inner surface of the left-front part 56 is a surface that faces the region 10 in the left-front part 56. The inner-side mounting member 230 includes a base section 232. The base section 232 extends in approximately parallel to the inner surface of the left-front part 56, and comes into contact therewith. A cylindrical part 234 is provided in the base section 232. The cylindrical part 234 protrudes from the base section 232 toward an outer side of the region 10, and enters a through-hole 56A in the left-front part 56. A tubular hole of the cylindrical part 234 is a fastening hole. A screw thread is formed in the tubular hole of the cylindrical part 234.

The outer-side mounting member 240 includes a connection section 242. The connection section 242 is provided to cover an upper-side portion, a front-side portion and a lower-side portion of the left-front part 56. The connection section 242 is connected to the inner-side mounting member 230. The connection section 242 comes into contact with an outer surface that is a surface opposite to the inner surface of the left-front part 56. The connection section 242 is disposed to be on a side opposite to the inner-side mounting member 230 with respect to the left-front part 56. An insertion hole 242A, which faces the through-hole 56A of the left-front part 56, is formed in the connection section 242. A screw 101 is inserted into the insertion hole 242A. The screw 101, which is inserted into the insertion hole 242A, enters the through-hole 56A. Specifically, the screw 101 is fastened to the tubular hole of the cylindrical part 234 that enters the through-hole 56A. According to this, the inner-side mounting member 230 and the outer-side mounting member 240 are connected to each other.

A cylindrical part 244, which is located approximately coaxially with the insertion hole 242A, is provided in the connection section 242. The cylindrical part 244 protrudes toward a side opposite to the left-front part 56 with respect to the connection section 242. A screw thread is formed in an outer peripheral surface of the cylindrical part 244.

The first ball joint 20 includes a first ball stud 211 and a first socket 221. The first ball stud 211 includes a first rod part 21A and a first sphere part 21B. The first rod part 21A is a rod-shaped portion. A fastening hole is formed in one end 21C of the first rod part 21A. A screw thread is formed in an inner peripheral surface that surrounds the fastening hole of the one end 21C. A cylindrical part 411 is provided in an upper end part of the inner surface 6 of the arm 104 (refer to FIG. 11). An insertion hole 41A is formed in a wall part that is located on a left side of the tubular hole of the cylindrical part 411. The insertion hole 41A faces a fastening hole of the one end 21C. A screw 73 is inserted into the insertion hole 41A, and is fastened to the fastening hole of the one end 21C. According to this, the one end 21C is fastened to the cylindrical part 411. That is, the one end 21C of the first rod part 21A is connected to the arm 104. Hereinafter, a position, at which the one end 21C and the cylindrical part 411 come into contact with each other, is referred to as a position R. The position R is a position at which the arm 104 and the first rod part 21A are connected to each other. In addition, the first rod part 21A passes through the tubular hole of the cylindrical part 411.

The first sphere part 21B is a spherical portion that is provided in the other end 21D. The other end 21D is an end that is opposite to the one end 21C of the first rod part 21A. A diameter of the first sphere part 21B is larger than an outer diameter of the first rod part 21A and is smaller than an inner diameter of the cylindrical part 244. The first sphere part 21B is disposed on an inner side of the cylindrical part 244. The first sphere part 21B comes into contact with the cylindrical part 244 through a right-side contact member 79 and a left-side contact member 78. The right-side contact member 79 and the left-side contact member 78 are elastically deformable rubbers which function as a buffer material. The right-side contact member 79 is formed in an approximately hemispherical shape, and comes into contact with a right-side portion of the first sphere part 21B. The left-side contact member 78 is formed in an approximately cylindrical shape, and comes into contact with a left-side portion of the first sphere part 21B. The right-side contact member 79 protrudes from a tubular hole of the cylindrical part 244 to a left-front side. The first rod part 21A passes through a tubular hole of the left-side contact member 78.

The first socket 221 is an approximately cylindrical member that is disposed coaxially with the cylindrical part 244 of the outer-side mounting member 240, and surrounds the cylindrical part 244 and the left-side contact member 78. The first socket 221 includes a first bottom part 22A and a first side part 22B. The first bottom part 22A is an approximately circular plate-shaped portion, and is disposed on a right side of the cylindrical part 244. A first hole part 23, which is a circular through-hole, is formed in an approximately central portion of the first bottom part 22A. The left-side contact member 78 is disposed on an inner side of the first hole part 23. The first rod part 21A passes through the first hole part 23. The first side part 22B is an approximately tubular portion that extends from a peripheral end of the first bottom part 22A toward the right side. A screw thread is formed on an inner peripheral surface of the first side part 22B. When the screw thread of the first side part 22B is fitted to the screw thread of the cylindrical part 244, the first socket 221 is screwed to the outer-side mounting member 240. That is, the first socket 221 is connected to the mounting member 5. The position 15B, at which the outer-side mounting member 240 and the left-front part 56 are connected to each other, is a position at which the first socket 221 and the mounting member 5 are connected to each other. As is the case with First Embodiment, the position 15B of Second Embodiment is located on the rear side and the left side with respect to the position 14 (refer to FIG. 9), and is located on the left side and the front side with respect to the position 17 (refer to FIG. 9). That is, the position 15B is located on the front side with respect to the first cable holding section 60 (refer to FIG. 9).

During screwing of the first socket 221 to the outer-side mounting member 240, the first socket 221 moves from an arm 104 side toward the mounting member 5 in a direction indicated by an arrow 24. When the first socket 221 moves, the first sphere part 21B is interposed between the right-side contact member 79 and the left-side contact member 78 from both sides in the right and left direction. The first sphere part 21B can rotate in an arbitrary direction by sliding respect to the right-side contact member 79 and the left-side contact member 78. In other words, the first socket 221 slidably supports the first sphere part 21B through the right-side contact member 79 and the left-side contact member 78. Accordingly, the first ball joint 20 can rotate the arm 104 with respect to the mounting member 5 in an arbitrary direction. In addition, the rotation of the arm 104 is restricted when the first rod part 21A comes into contact with the left-side contact member 78.

As illustrated in FIG. 9, the image display section 30 is movably supported by the arm 104 through the connection mechanism 90 to be described later. The image display section 30 includes a casing 31. The casing 31 in Second Embodiment has the same shape as in the casing 31 (refer to FIGS. 1 to 3, and FIGS. 5 to 7) in First Embodiment. A protrusion 322, which protrudes toward the rear side, is formed in a base end part 31B that is the other end part of the casing 31. A fastening hole 32A (refer to FIG. 13) is formed in a rear portion of a right surface of the protrusion 322. A screw thread is formed in the fastening hole 32A.

Figure 13:
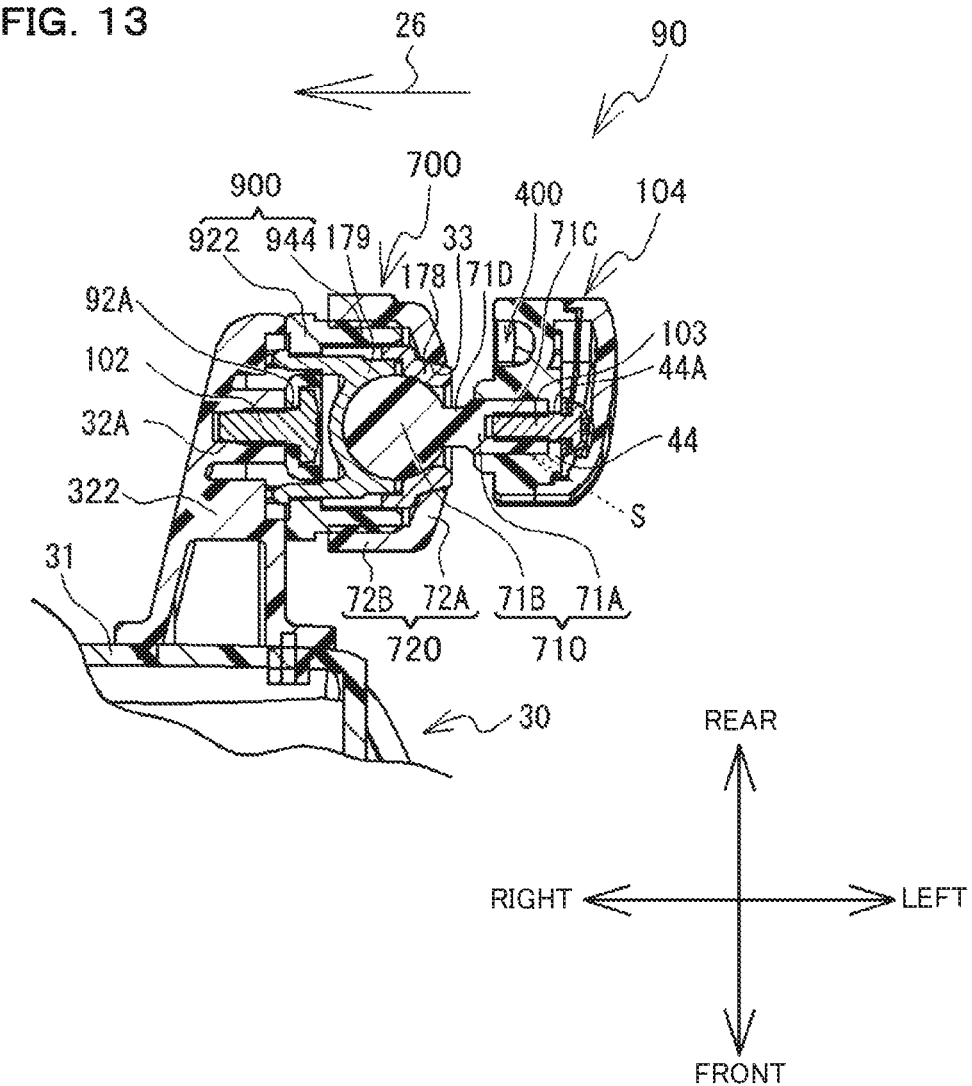
FIG. 13 is a cross-sectional view of a connection mechanism 90 that is seen from an arrow direction in line B-B in FIG. 10.

As illustrated in FIG. 13, the connection mechanism 90 connects the image display section 30 to the arm 104. The connection mechanism 90 includes a cylindrical member 900, and a second ball joint 700. The cylindrical member 900 is a cylindrical member that is long in the right and left direction, and is mounted on a left surface of the protrusion 322. The cylindrical member 900 includes a bottom part 922. The bottom part 922 is an approximately circular plate-shaped portion, and comes into contact with the left surface of the protrusion 322. An insertion hole 92A is formed in a central portion of the bottom part 922. The insertion hole 92A faces the fastening hole 32A of the protrusion 322. A screw 102 is inserted into the insertion hole 92A and is screw-fitted into the fastening hole 32A. According to this, the cylindrical member 900 is connected to the protrusion 322. A side part 944 is provided on a peripheral end of the bottom part 922. The side part 944 is a tubular portion that extends from the bottom part 922 to the left side. A screw tread is formed on an outer peripheral surface of the side part 944.

The second ball joint 700 includes a second ball stud 710 and a second socket 720. The second ball stud 710 includes a second rod part 71A and a second sphere part 71B. The second rod part 71A is a rod-shaped portion. A fastening hole is formed in one end 71C of the second rod part 71A. A screw thread is formed in the fastening hole of the one end 71C. A cylindrical part 44 is provided in a lower end part of the inner surface 6 of the arm 104 (refer to FIG. 11). An insertion hole 44A is formed in a wall part that is located on a left side of a tubular hole of the cylindrical part 44. The insertion hole 44A faces the fastening hole of the one end 71C. A screw 103 is inserted in the insertion hole 44A, and is fastened to the fastening hole of the one end 71C. According to this, the one end 71C is fastened to the cylindrical part 44. That is, the one end 71C of the second rod part 71A is connected to the arm 104. The arm 104 is connected to the protrusion 322 of the image display section 30 through the one end 71C. In addition, the screw 103 passes through the tubular hole of the cylindrical part 44. Hereinafter, a position, at which the one end 71C of the second rod part 71A and the cylindrical part 44 come into contact with each other, is referred to as a position S. The position S is a position at which the second rod part 71A and the arm 104 are connected to each other, and is a position at which the arm 104 and the image display section 30 are connected to each other.

The second sphere part 71B is a spherical portion that is provided in the other end 71D. The other end 71D is an end that is opposite to the one end 71C of the second rod part 71A. A diameter of the second sphere part 71B is larger than an outer diameter of the second rod part 71A and is smaller than an inner diameter of the cylindrical part 44. The second sphere part 71B is disposed on an inner side of the side part 944 of the cylindrical member 900. The second sphere part 71B comes into contact with the cylindrical member 900 through a right-side contact member 179 and a left-side contact member 178. The right-side contact member 179 and the left-side contact member 178 are elastically deformable rubbers which function as a buffer material. The right-side contact member 179 is formed in an approximately hemispherical shape, and comes into contact with a right-side portion of the second sphere part 71B. The left-side contact member 178 is formed in an approximately cylindrical shape, and comes into contact with a left-side portion of the second sphere part 71B. The second rod part 71A passes through a tubular hole of the left-side contact member 178. The right-side contact member 179 protrudes from the side part 944 to a left-front side.

The second socket 720 is an approximately cylindrical member that is disposed coaxially with the cylindrical member 900, and surrounds the side part 944 and the left-side contact member 178. The second socket 720 includes a second bottom part 72A and a second side part 72B. The second bottom part 72A is an approximately circular plate-shaped portion. The second bottom part 72A is disposed on a right side of the side part 944. A second hole part 33, which is a circular through-hole, is formed in an approximately central portion of the second bottom part 72A. The left-side contact member 178 is disposed on an inner side of the second hole part 33. That is, the second rod part 71A passes through the second hole part 33. The second side part 72B is an approximately tubular portion that extends from a peripheral end of the second bottom part 72A toward the right side. A screw thread is formed on an inner peripheral surface of the second side part 72B. When the screw thread of the second side part 72B is fitted to the screw thread of the side part 944, the second socket 720 is screwed to the cylindrical member 900. That is, the second socket 720 is connected to the protrusion 322 of the image display section 30.

During screwing of the second socket 720 to the cylindrical member 900, the second socket 720 moves from the arm 104 side toward a mounting member 5 side in a direction indicated by an arrow 26. When the second socket 720 moves, the second sphere part 71B is interposed between the right-side contact member 179 and the left-side contact member 178 from both sides in the right and left direction. The second sphere part 71B can rotate in an arbitrary direction by sliding with respect to the right-side contact member 179 and the left-side contact member 178. In other words, the second socket 720 slidably supports the second sphere part 71B through the right-side contact member 179 and the left-side contact member 178. Accordingly, the second ball joint 700 can rotate the image display section 30 with respect to the arm 104 in an arbitrary direction. In addition, the rotation of the image display section 30 is restricted when the second rod part 71A and the left-side contact member 178 come into contact with each other.

As illustrated in FIG. 9 to FIG. 11, the second cable holding section 400 is provided (for example, is formed) on the inner surface 6 of the arm 104. The second cable holding section 400 of Second Embodiment is a groove that continuously extends along a longitudinal direction (for example, the up and down direction) of the arm 104 as an example. The second cable holding section 400 is located on the rear side with respect to the center of the inner surface 6 in a width direction of the arm 104. The width direction of the arm 104 is a direction (for example, the front and rear direction) that is perpendicular to the longitudinal direction of the arm 104, and is parallel to the inner surface 6. The second cable holding section 400 is located on the rear side with respect to the cylindrical part 411 and the first rod part 21A. In addition, the second cable holding section 400 is located on the rear side with respect to the cylindrical part 44 and the second rod part 71A. That is, the second cable holding section 400 is located on the rear side with respect to each of the position R and the position S.

The second cable holding section 400 extends to an upper end of the arm 104. In other words, the second cable holding section 400 extend to an end of the arm 104 in a direction extending from the image display section 30 to the position 15B, in the longitudinal direction of the arm 104. The second cable holding section 400 extends to a lower end of the arm 104. In other words, the second cable holding section 400 extends to an end of the arm 104 in a direction extending from the position 15B to the image display section 30, in the longitudinal direction of the arm 104.

The second cable holding section 400 includes a groove bottom, and a pair of side walls. The groove bottom extends along the longitudinal direction of the arm 104. The pair of side walls respectively extend from both ends of the groove bottom in a groove width direction, and face each other. The groove width direction of the second cable holding section 400 matches, for example, a width direction of the arm 104. The size (for example, a depth) of the second cable holding section 400 in the right and left direction, and the groove width of the second cable holding section 400 may be approximately the same as those of the first cable holding section 60.

As illustrated in FIG. 9 and FIG. 10, the cable 39 electrically connects the image display section 30 and an external device (not illustrated) to each other. One end of the cable 39 is connected to a control substrate (not illustrated) of the image unit 37 (refer to FIG. 9). The cable 39, which is connected to the control substrate, is led out from a connection hole (not illustrated), which is formed on a rear surface of the casing 31, to the outside. The connection hole is a hole that is formed in the rear surface of the casing 31 at a portion on the left side with respect to the protrusion 322 and on the right side with respect to the arm 104. That is, the cable 39 is connected to the casing 31 of the image display section 30 between the arm 104 and the half mirror 35 (refer to FIG. 9). In addition, the connection hole is located at a central portion on the rear surface of the casing 31 in the up and down direction.

The cable 39 passes through a lower side of the second socket 720, and is detachably pushed into the second cable holding section 400. In the cable 39, a portion on a lower side of the second socket 720 and on a right side of the other end part 4B of the arm 104 is loosened (refer to FIG. 10). In the cable 39, a portion, which is pushed into the second cable holding section 400, extends in an approximately linear shape along the inner surface 6 of the arm 104.

Preferably, the groove width of the second cable holding section 400 may be slightly smaller than the diameter of the cable 39. The cable 39 is detachably pushed into an inner side of the second cable holding section 400 from the lower end to the upper end of the arm 104. According to this, the cable 39 is detachably held by the second cable holding section 400 in a posture of passing through the rear side of the cylindrical parts 411 and 44 along the longitudinal direction of the arm 104. The diameter of the cable 39 is smaller than the depth of the second cable holding section 400. Accordingly, in the cable 39, the portion, which is pushed into the second cable holding section 400, is less likely to protrude to the right side with respect to the inner surface 6 of the arm 104.

The cable 39, which is held by the second cable holding section 400, is led out from the upper end of the arm 104. The cable 39 is pushed into the holding section 69 from a front end (that is, the end 69A in FIG. 2) of the first holder 691 to a lower end of the fourth holder 694. The cable 39 is detachable from the holding section 69. In the cable 39, a portion, which is located between the upper end of the arm 104 and the front end of the first holder 691, passes through the rear side of the position 15B and extends through the upper side of the mounting member 5. That is, in the cable 39, a portion, which is wired on the lower end of the arm 104, the upper end of the arm 104, and the front end of the first holder 691, passes through the rear side of the position 15B along the longitudinal direction of the arm 104. In other words, the cable 39 is held by the second cable holding section 400 in a posture of passing through the rear side of the position 15B along the longitudinal direction of the arm 104. In the cable 39, a portion, which is located between the upper end of the arm 104 and the front end of the first holder 691, is loosened (refer to FIG. 9). In addition, the cable 39, which is led out from the rear end of the fourth holder 694, is connected to an external device (not illustrated) such as an image source device and a relay device that relays a connection with the image source device.

Furthermore, although not illustrated, the image display unit 7 can be connected to the mounting member 5 in a manner capable of emitting image light to a right eye of a user. Specifically, the connection mechanism 80 is mounted on the right-front part 54 of the mounting member 5, and an alternative arm (not illustrated) is connected to the connection mechanism 80. The alternative arm is an arm symmetric to the arm 104 with respect to a virtual plane that is perpendicular to the right and left direction and passes through the position 21. The alternative arm supports the image display section 30 through the connection mechanism 90. In this case, the cable 39 is detachably pushed into a second cable holding section (not illustrated) that is provided in the alternative arm, and the holding section 68 of the first cable holding section 60.

Description will be given of an overview of positional adjustment of the image display unit 7 in a case where the mounting member 5 is mounted on a head of a user with reference to FIG. 10, FIG. 12, and FIG. 13. The image display unit 7 before the positional adjustment is disposed at a position different from a use position. For example, the user rotates the arm 104 while holding the image display unit 7 with a left hand. The first rod part 21A rotates along with the first sphere part 21B, and thus the arm 104 rotates to a predetermined position. The image display section 30 moves in accordance with the rotation of the arm 104. Here, in the cable 39, a portion, which is pushed into the second cable holding section 400, does not protrude on the right side with respect to the inner surface 6, and thus the portion is less likely to come into contact with the rotating first rod part 21A. Accordingly, the cable 39 is less likely to disturb the user. In addition, in the cable 39, a portion, which is located between the upper end of the arm 104 and the front end of the first holder 691, is loosened, and thus the portion is less likely to be an extended posture regardless of a rotational position of the arm 104. The cable 39 is less likely to restrict the rotation of the arm 104, and thus the cable 39 is less likely to disturb the user.

After rotating the arm 104 to a predetermined rotational position, the user rotates only the image display section 30 with respect to the arm 104. The second rod part 71A rotates along with the second sphere part 71B, and thus the image display section 30 rotates to a position at which the half mirror 35 is located in front of a left eye of the user. According to this, the image display unit 7 moves to the use position. Here, in the cable 39, a portion, which is pushed into the second cable holding section 400, does not protrudes to the right side with respect to the inner surface 6, and thus the portion is less likely to come into contact with the rotating second rod part 71A. In addition, in the cable 39, a portion, which is located on a lower side of the second socket 720 and on a right side of the other end part 4B of the arm 104, is loosened, and thus the portion is less likely to be an extended posture regardless of a rotational position of the image display section 30, and thus the portion is less likely to pull the image display section 30. That is, the cable 39 is less likely to restrict the rotation of the image display section 30. Accordingly, the cable 39 does not disturb the user.

As described above, the HMD 101 is used in a state in which the mounting member 5 is mounted on the head of the user and the image display unit 7 is located at the use position. In this case, the cable 39 is held by the second cable holding section 400 in a posture of passing through the rear side of the position 15B along the longitudinal direction of the arm 104. Accordingly, in a case where the HMD 101 is used, the cable 39 is not disposed between the half mirror 35 and the left eye of the user, and thus the cable 39 is less likely to block a visual field of the user. In addition, even when the cable 39 is removed from the second cable holding section 400 in use of the HMD 101, the cable 39 moves downward due to the weight thereof, and thus the cable 39 is less likely to be entangled with the arm 104. Accordingly, the cable 39 during using of the HMD 101 is less likely to disturb the user. In addition, the second cable holding section 400, to and from the cable 39 is attached and detached, is provided (for example, is formed) on the inner surface 6 that is a surface of the arm 104. According to this, in a case where the HMD 101 is not used, the cable 39, which is connected to the image display section 30, is easily attached and detached to and from the second cable holding section 400. That is, attachment and detachment of the cable 39 to and from the arm 104 is easy. Accordingly, attachment and detachment between the arm 104 and the image display section 30 is easy. As described above, attachment and detachment between the arm 104 and the image display section 30 is easy, and thus it is possible to realize the HMD 101 in which the cable 39 is less likely to disturb the user.

The second cable holding section 400 is located on the rear side with respect to the center of the inner surface 6 in the width direction of the arm 104. According to this, the cable 39, which is pushed into the second cable holding section 400, is likely to be located on the rear side with respect to the left eye of the user, and thus is further less likely to block the visual field of the user. In addition, even when the cable 39 is removed from the second cable holding section 400 in use of the HMD 101, the cable 39 is not entangled with the arm 104. Accordingly, the cable 39 is likely to move downward due to the weight thereof. As a result, in the HMD 101, the cable 39 is further less likely to disturb the user.

The inner surface 6 faces a right direction that is a direction extending from the arm 104 to the half mirror 35. Accordingly, in a case where the HMD 101 is used, a portion, which is held by the second cable holding section 400, of the cable 39 is less likely to be confirmed with eyes of a person other than the user. Accordingly, an external appearance of the HMD 101 may be satisfactory.

The cable 39 is connected to the casing 31 of the image display section 30 between the arm 104 and the half mirror 35. According to this, even when the image display section 30 rotates with respect to the arm 104, a portion, which is located on the lower side of the second socket 720 and on the right side of the other end part 4B, of the cable 39 is likely to maintain a loose posture. The cable 39 is less likely to pull the rotating image display section 30. Accordingly, in the HMD 1, the cable 39 is further less likely to disturb the user.

The second cable holding section 400 is located on the rear side with respect to the position S (refer to FIG. 13). That is, in the second cable holding section 400, even in a case where the cable 39 is removed from the second cable holding section 400 when the HMD 1 is used, the cable 39 is less likely to be entangled with the arm 104 and the image display section 30. Accordingly, in the HMD 101, the cable is further less likely to disturb the user.

The second cable holding section 400 is a groove that continuously extends along the longitudinal direction of the arm 104. The cable 39, which is connected to the image display section 30, can be more easily attached and detached to and from the second cable holding section 400 that is provided in the arm 104. Accordingly, in the HMD 101, attachment and detachment between the image display section 30 and the arm 104 can be further easier. In addition, in the cable 39, a portion, which is pushed into the second cable holding section 400, extends in an approximately linear shape along the inner surface 6 of the arm 104. Accordingly, in the cable 39, the portion, which is pushed into the second cable holding section 400, is less likely to be loosened with respect to a case where a plurality of groves in which the second cable holding section 400 is provided intermittently along the up and down direction.

The second cable holding section 400 extends to one end (for example, an upper end) of the arm 104. The cable 39 is led out from the upper end of the arm 104 to the upper side along the longitudinal direction of the arm 104. Accordingly, in the cable 39, a portion, which passes through the rear side with respect to the position 15B and the front side with respect to the first cable holding section 60, is likely to be wired on the upper side of the mounting member 5 in a posture that is curved toward the upper side. That is, in the cable 39, the portion, which passes through the rear side with respect to the position 15B and the front side with respect to the first cable holding section 60, is likely to be loosened. The cable 39 is less likely to pull the image display section 30 that moves in accordance with the rotation of the arm 104. Accordingly, in the HMD 101, the cable 39 is further less likely to disturb the user.

The second cable holding section 400 extends to the other end (for example, a lower end) of the arm 104. The cable 39 is led out from the lower end of the arm 104 to the lower side along the longitudinal direction of the arm 104. Accordingly, in the cable 39, a portion, which is located on the lower side of the second socket 720 and on the right side of the other end part 4B of the arm 104, is likely to be wired in a posture that is curved toward the lower side. That is, in the cable 39, the portion, which is located on the lower side of the second socket 720 and on the right side of the other end part 4B of the arm 104, is likely to be loosened. The cable 39 is less likely to pull the rotating image display section 30. Accordingly, in the HMD 1, the cable 39 is further less likely to disturb the user.

Since the HMD 101 comprises the first ball joint 20, the arm 104 can smoothly rotate. In addition, the second cable holding section 400 is provided on the rear side with respect to the position R (refer to FIG. 12). Accordingly, even when the cable 39, which is held by the second cable holding section 400, is removed in use of the HMD 101, the cable 39 falls down in a direction to be spaced away from the rear side of the arm 104. The cable 39 is less likely to be entangled with the first ball joint 20. Accordingly, in the HMD 101, the arm 104 can smoothly rotate, and the cable 39 is less likely to disturb the user.

Since the HMD 101 comprises the second ball joint 700, the image display section 30 can smoothly rotate. In addition, the second cable holding section 400 is provided on the rear side with respect to the position S (refer to FIG. 13). Accordingly, even when cable 39, which is held by the second cable holding section 400, is removed in use of the HMD 101, the cable 39 falls down in a direction to be spaced away from the rear side of the arm 104. The cable 39 is less likely to be entangled with the second ball joint 700. Accordingly, in the HMD 1, it is possible to smoothly rotate the image display section 30, and the cable 39 is less likely to disturb the user.

Furthermore, the present disclosure is not limited to the above-described First and Second Embodiments, and various modifications can be made. For example, the trapezoidal protrusions 66 and 67, which are respectively provided with the holding sections 68 and 69, may not be provided. In this case, the holding sections 68 and 69 may be directly formed on lateral surfaces of the right-rear part 55 and the left-rear part 57. Each of the pads 75 to 77 may be provided in a plural number, and may be disposed intermittently in a direction extending along a direction in which the mounting member 5 is curved. A reflective member, which does not allow external light to be transmitted therethrough and substantially totally reflects image light that is incident thereon, may be used instead of the half mirror 35. An optical path deflection member such as a prism and a diffraction lattice may be used instead of the half mirror 35. The connection mechanisms 8 and 9 may not be a ball-joint type movable section. For example, it is possible to employ a movable section having rotational degrees of freedom of two axes or more in combination of two or more hinges, and the like. The mounting member 5 may not have a configuration in which the entirety thereof is curved. A curved portion of the mounting member 5 may be a part of the mounting member 5.

At the right-side part 51 and the left-side part 52, the trapezoidal protrusions 66 and 67 may be provided continuously or intermittently along the curved shape. Similarly, at the right-side part 51 and the left-side part 52, the holding sections 68 and 69 may be provided continuously or intermittently along the curved shape. Each of the first protrusions 685 and 695 may be provided in a plural number. In this case, a plurality of the first protrusions 685 and 695 may be provided on both sides of the pair of side walls of the fourth holders 684 and 694. Alternatively, each of the first protrusions 685 and 695 may be provided at both portions of lateral surfaces of the trapezoidal protrusions 66 and 67, between which the openings of the fourth holders 684 and 694 are interposed in the groove width direction. The second protrusions 686 and 696, which are respectively formed in the first holders 681 and 691 and the second holders 682 and 692, may be provided at one site or a plurality of sites such as two or more sites without limitation to five sites. In each of the first holders 681 and 691 and the second holders 682 and 692, the second protrusions 686 and 696 may be provided on one side or the other side of a pair of side walls, or on both of the side walls.

The HMD may not be provided with the connection mechanism that connects the mounting member and the arm to each other. For example, in a case where the connection mechanism 90 is not provided in the HMD 101, a relative position of the image display section 30 with respect to the arm 104 does not vary. Even in this case, the arm 104 rotates by sliding of the first sphere part 21B with respect to the right-side contact member 79 and the left-side contact member 78. According to this, the image display section 30 is movably supported by the arm 104. Similarly, the connection mechanism 9 may be not provided in the HMD 1.

In addition, the connection mechanisms 8, 9, 80, and 90 may be a movable mechanism, which is configured in combination of two or more hinges (not illustrated) and moves around two or more rotational axes intersecting each other, instead of the ball-joint type movable mechanism.

In addition, for example, a flexible arm, which extends in a specific direction from the mounting member 5 and is deformable in an arbitrary shape, may be used as the arm. In this case, the connection mechanisms 8 and 80 are not necessary. As the flexible arm, for example, a base section, around which an approximately columnar metal member is wound in a spiral shape, may be provided. In addition, a base section having a configuration, in which a plurality of resin members formed in an approximately spherical shape are sequentially connected to each other along a specific direction in a swing manner, may be provided. In this case, the flexible arm can swing by changing a posture of the base station. According to this, a user can adjust an arrangement position of the image display section 30.

The second cable holding section 400 may be provided on a surface (hereinafter, referred to as "outer surface") that is opposite to the inner surface 6 of the arm 104. In this case, the cylindrical parts 411 and 44 are not disposed on an outer surface of the second cable holding section 400, and thus the second cable holding section 400 can be disposed at an approximately the same position as that of the cylindrical parts 411 and 44 in the width direction of the arm 104. Accordingly, it is possible to reduce a length of the arm 104 in the width direction.

An extension direction of the second cable holding section 400 may not be parallel to the longitudinal direction of the arm 104. For example, in the inner surface 6, the second cable holding section 400 may be provided at a portion between the cylindrical parts 411 and 44, and may extend in a direction that intersects the longitudinal direction and the width direction of the arm 104.

For example, the second cable holding section 400 may be a plurality of hook members (not illustrated), which are provided on the inner surface 6 and are arranged along the longitudinal direction of the arm 104, instead of being a groove. In this case, the plurality of hook members are formed to have a cross-section, for example, in an approximately J-shape. A space formed on an inner side of the hook members is slightly smaller than the cable 39. The cable 39 is hooked by the plurality of hook members, and thus the cable 39 is detachably held.

The cable 39 may be pushed into the second cable holding section 400 while positioning thereof. Hereinafter, description will be given of an HMD 201 that is a modification example of the HMD 101 with reference to FIG. 14 and FIG. 15. In addition, FIG. 14 and FIG. 15 are schematic views of the HMD 201 located in a use position, and the mounting member 5 and the connection mechanisms 80 and 90 are not illustrated in the drawings.

Figure 14:
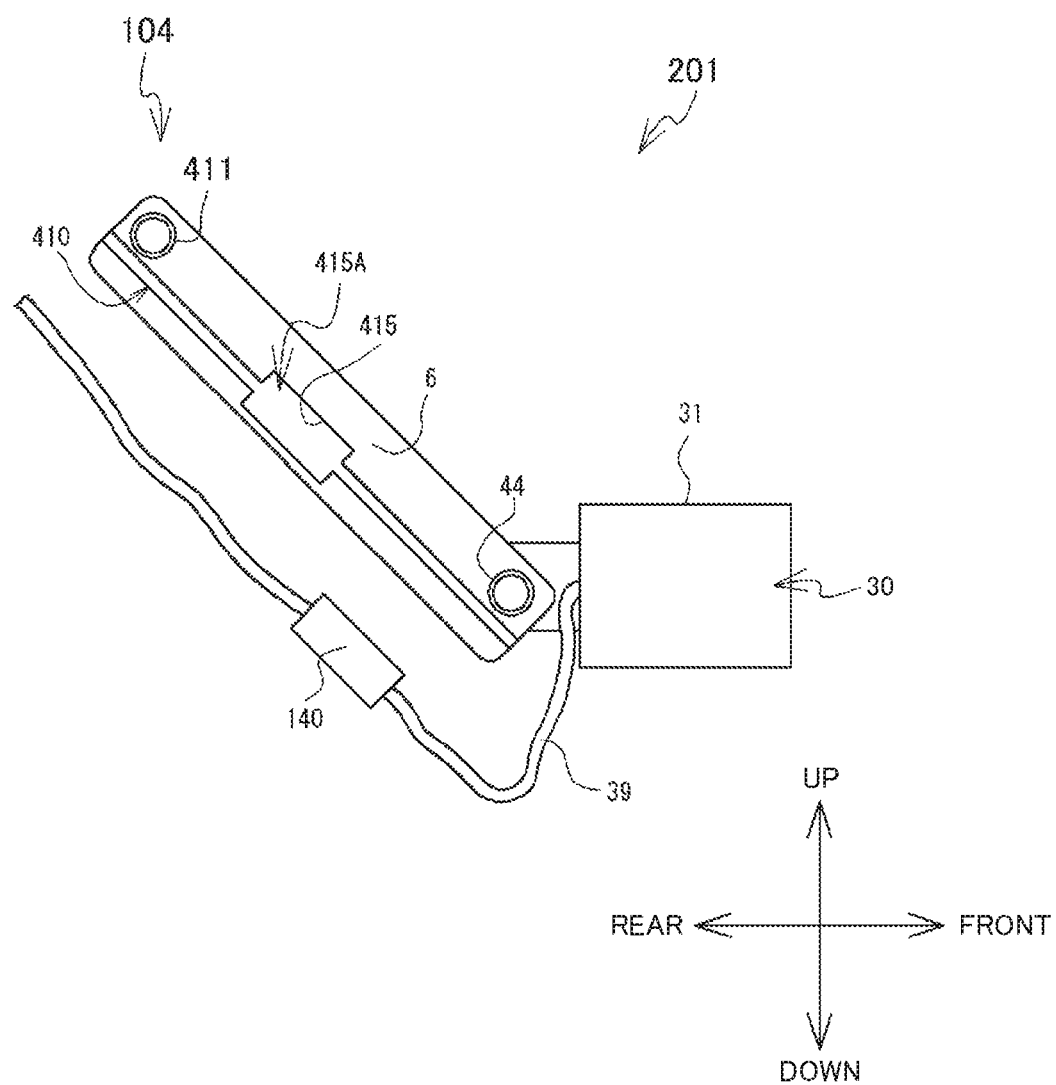
FIG. 14 is a right side view of an HMD 201 according to a modification example.

As illustrated in FIG. 14, the HMD 201 has the same configuration as that of the HMD 101 except that a fixing member 140 is provided and a second cable holding section 410 is provided instead of the second cable holding section 400. For example, the fixing member 140 is a cylindrical cable bushing made of a resin. When a tubular hole of the fixing member 140 is fitted to the outer peripheral surface of the cable 39, the fixing member 140 is fixed to the cable 39. The second cable holding section 410 is a groove that is provided (for example, is formed) in the inner surface 6. The second cable holding section 410 extends along the longitudinal direction of the arm 104, and is provided with an engagement section 415 at a central portion in an extension direction. The engagement section 415 is a wall portion that surrounds a space 415A. The space 415A is formed by disposing a recess on the inner surface 6. The space 415A is an approximately circular columnar shape, and has approximately the same size as that of the fixing member 140.

Figure 15:
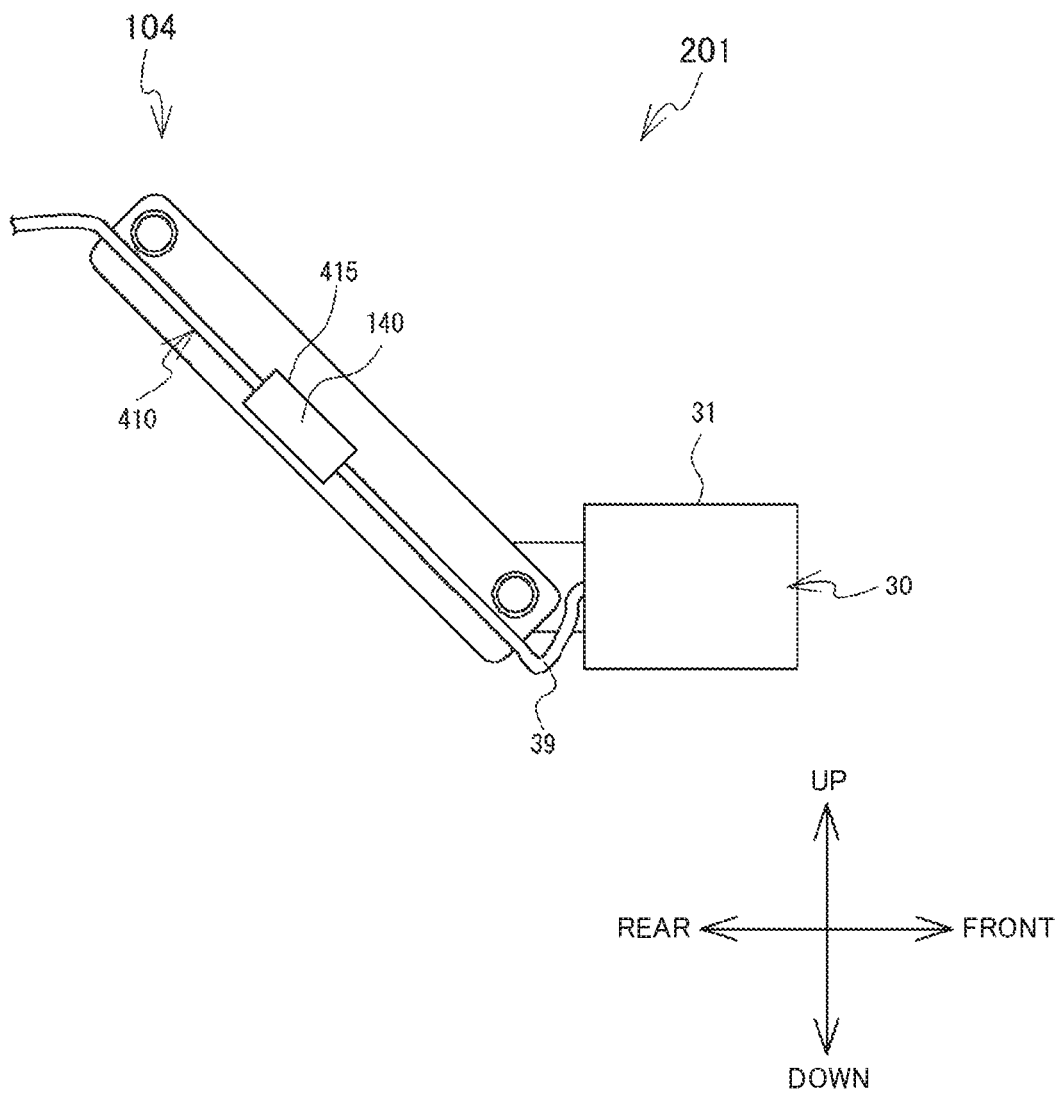
FIG. 15 is a right side view of the HMD 201 in which a cable 39 is held by a second cable holding section 410.

As illustrated in FIG. 15, the fixing member 140 is detachably fitted into the space 415A (refer to FIG. 14) and engages with the engagement section 415. The cable 39, which is led out from the casing 31 of the image display section 30, is pushed into the second cable holding section 410 at a position at which the fixing member 140 engages with the engagement section 415. That is, the cable 39 is pushed into the second cable holding section 410 while positioning thereof. Accordingly, even in a case where a user removes and mounts the cable 39 from and to the second cable holding section 410, the cable 39, which is located between the lower end of the arm 104 and the casing 31, is likely to be loosened. Accordingly, even in a case where the image display section 30 moves with respect to the arm 104, the cable 39, which is located between the lower end of the arm 104 and the casing 31, is less likely to have an extended posture. The cable 39 is less likely to pull the image display section 30. Accordingly, in the HMD 201, the cable 39 is less likely to disturb the user.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims. Further, in the present specification and the attached claims, any item described in the singular includes such items in the plurality unless indicated specifically in the context.

What is claimed is:

1. An image display unit, comprising:
    a rod-shaped arm;
    an image display section that displays an image;
    a first ball joint that connects the arm to a connection object;
    a second ball joint that connects the arm to the image display section;
    a cable that is led out from the image display section; and
    a groove that is provided in a surface of the arm, extends in a longitudinal direction of the arm, and detachably holds the cable, wherein the first ball joint includes,
- a first ball stud including a first rod part of which one end is connected to the arm, and a first sphere part that is provided in the other end of the first rod part, and
- a first socket that includes a circular first hole part through which the first rod part passes, and slidably supports the first sphere part in a case where the arm is connected to the connection object, the second ball joint includes,
- a second ball stud which includes a second rod part of which one end is connected to the arm, and a second sphere part that is provided in the other end of the second rod part, and which is spaced away from the first ball stud in the longitudinal direction, and
- a second socket that is connected to the image display section to slidably support the second sphere part, and includes a circular second hole part through which the second rod part passes, and the groove is located on one side with respect to the first rod part and the second rod part in a width direction of the arm.

\* \* \* \* \*